United States Patent [19]

Peters et al.

[11] Patent Number: 6,065,102

[45] Date of Patent: May 16, 2000

[54] FAULT TOLERANT MULTIPLE CLIENT MEMORY ARBITRATION SYSTEM CAPABLE OF OPERATING MULTIPLE CONFIGURATION TYPES

[75] Inventors: Michael J. Peters, Fort Collins; Gene Maine, Longmont, both of Colo.

[73] Assignee: Adaptec, Inc., Milpitas, Calif.

[21] Appl. No.: 08/965,718

[22] Filed: Nov. 7, 1997

Related U.S. Application Data

[63] Continuation-in-part of application No. 08/928,984, Sep. 12, 1997, Pat. No. 6,023,784.

[51] Int. Cl.[7] .................................................. G06F 13/18
[52] U.S. Cl. ........................ 711/151; 711/130; 711/158; 710/107
[58] Field of Search .................................... 711/114, 151, 711/158, 131, 149, 130; 710/128, 113, 114, 116, 107, 110

[56] References Cited

U.S. PATENT DOCUMENTS

| | | | |
|---|---|---|---|
| 4,760,515 | 7/1988 | Malmquist et al. | 710/121 |
| 5,195,089 | 3/1993 | Sindhu et al. | 370/235 |
| 5,426,765 | 6/1995 | Stevens et al. | 711/131 |
| 5,440,698 | 8/1995 | Sindhu et al. | 709/225 |
| 5,455,934 | 10/1995 | Holland et al. | 711/4 |
| 5,704,058 | 12/1997 | Derrick et al. | 711/168 |
| 5,768,548 | 6/1998 | Young et al. | 710/129 |
| 5,819,310 | 10/1998 | Vishlitzky | 711/114 |
| 5,884,027 | 3/1999 | Garbus et al. | 709/250 |

OTHER PUBLICATIONS

The RAIDbook—A Source Book for Disk Array Technology, 4th Edition, ISBN 1–879936–90–9, Aug. 8, 1994.

*Primary Examiner*—Do Hyun Yoo
*Assistant Examiner*—Christopher S. Chow
*Attorney, Agent, or Firm*—Duft, Graziano & Forest, P.C.

[57] ABSTRACT

A multiple client memory arbitration system supporting simultaneous arbitration access to a local cache memory and a remote cache memory for mirrored write operations to both the local cache memory and the remote cache memory by one of a local arbitration device or a remote cache memory at a time. The enhanced arbitration system includes active/active failover control by a surviving one of the local arbitration device or the remote arbitration device that have participated in the mirrored write operations between the respective local cache memory and the remote cache memory.

15 Claims, 15 Drawing Sheets

FAULT TOLERANT MULTIPLE CLIENT MEMORY ARBITRATION SYSTEM CAPABLE OF OPERATING MULTIPLE CONFIGURATION TYPES

RELATED APPLICATIONS

The present application is a Continuation-in-part of U.S. patent application Ser. No. 08/928,984 filed Sep. 12, 1997, now U.S. Pat. No. 6,023,748, filed Feb. 8, 2000, the text of which is incorporated herein by reference to the same extent as though the text were actually present.

FIELD OF THE INVENTION

This invention relates to the field of memory arbitration, and in particular to a configurable arbitration device that arbitrates multiple client access to a single common memory in addition to failover features and memory mirroring support for use in dual board fault tolerant implementations of an Input/Output (I/O) bus bridge configuration.

PROBLEM

Many situations exist in computing systems where there are multiple clients competing for access to a single memory. One such situation is in a bridge, also known as an I/O bus bridge in an I/O controller, that interconnects two high-performance high-bandwidth I/O buses. The reason an I/O bus bridge can have multiple clients of a single memory is because one type of bridge configuration includes a single cache memory that functions as a bidirectional buffer between the attached I/O busses, and there are multiple processes and/or engines within the I/O bus bridge that support bridge operations by reading and writing data and/or I/O commands to and from the single cache memory. Each of the multiple processes and/or engines within the I/O bus bridge are clients of the single cache memory.

However, there are several reasons why existing I/O bus bridges perform below the maximum bandwidth capacity B of the I/O busses that the bridges connect. One reason is that existing I/O bus bridges implement inefficient cache memory access arbitration schemes that are a contributing factor to adversely impacting bridge performance in arbitration configurations where multiple internal and/or external clients share a single cache memory.

A preferred solution to arbitrating access to a single shared memory by multiple clients is a multiple client memory arbitration system as disclosed and claimed in the documents identified above in the Related Applications section. However, support for fault tolerant features and write back caching features are desirable in a multiple client memory arbitration system, and such features do not presently exist in a form that minimize single points of failure while not inhibiting I/O bus bridge and/or I/O controller performance or bandwidth capacity.

For example, one fault tolerant configuration solution might be to support active/passive failover between two arbitration devices that have access to the same cache memory. However, this solution is undesirable if both arbitration devices reside on the same circuit board because there are single points of failure including the circuit board, the cache memory, and the communication bus the circuit board uses to communicate with other system components. Failover between the two arbitration device components is not useful if there is any single point of failure in the configuration that will take down the entire system. Similarly, supporting active/passive failover between redundant circuit boards that both contain identical arbitration components creates a single point of failure if only one cache memory exists between the two boards. Even if each of the redundant circuit boards contains its own cache memory and both cache memories are maintained in full synchronization, only the active circuit board is performing useful work. Finally, supporting active/active failover between redundant circuit boards that both contain identical arbitration components can significantly increase the work performed because both circuit boards are active at the same time. However, keeping both memories on both circuit boards updated to facilitate uninterrupted failover is a complex and performance impacting proposition.

One additional factor that can adversely impact performance and reliability in an I/O bus bridge configuration is the selection and implementation of write through caching or write back caching. Write through caching requires that data written to the cache memory be safely written out of the cache memory to its destination before the transaction is considered complete. Although write through caching allows an incomplete transaction to be repeated without losing data, there is not performance gain by using write through caching. Alternatively, write back caching considers a transaction complete once the data is written to the cache memory. Thus, write back caching is a significant performance improvement over write through caching, however, an interrupted transaction can mean that data is lost which is unacceptable for certain I/O transactions such as Redundant Arrays of Independent Disks (RAID) transactions that rely on operating on data while it resides in the cache memory.

For these reasons, there exists an ongoing need for a configurable, high-performance, isochronous arbitration system in a low latency I/O bus bridge implementation that supports fault tolerant configurations based on redundant circuit boards. Such a system has not existed prior to the present invention as disclosed in this document.

SOLUTION

The above identified problems are solved and an advancement achieved in the field in view of the enhanced multiple client memory arbitration system of the present invention. The enhanced multiple client memory arbitration system includes all the arbitration device features disclosed in the document or documents listed in the section titled "Related Applications", hereinafter referred to as the basic or non-enhanced version of an arbitration device, arbitrator, or arbitration system. In addition to the basic arbitration device features, the enhanced multiple client memory arbitration system also includes a multiple device slave configuration and write back caching with memory mirroring in support of an active/active failover feature for a redundant circuit board fault tolerant I/O controller configuration.

The multiple device slave configuration is an independent slave arbitration device configuration that allows a first multiple device slave arbitrator the individual autonomy to independently arbitrate multiple client access to a first local cache memory on a first of two redundant circuit boards, concurrently with a second multiple device slave arbitrator independently arbitrating multiple client access to a second local cache memory on a second of two redundant circuit boards. The result of the two independently operating arbitration devices is that the total work available to complete is shared by both independent arbitration devices and the redundant circuit boards are truly redundant for fault tolerance purposes.

The memory mirroring feature of the enhanced multiple client memory arbitration system includes the ability for the cache memory interface portion of a multiple device slave configured arbitrator to identify the need for a mirrored write operation for types of control or meta data that must reside on the first cache memory and the second cache memory of a redundant circuit board configuration. Mirroring the identical control or meta data on both the first cache memory and the second cache memory facilitates a smooth active/active failover of operational control from a failed one of the two redundant circuit boards to the surviving one of the two redundant circuit boards without losing data due to the failover operation itself or the need to perform a failover operation. Note that nothing in the support of active/active failover from a first circuit board to a second circuit board precludes active/passive failover among individual arbitration components within the same circuit board.

Remote arbitration for mirrored write access is performed by an independent or external master mirrored write arbitrator that resides on the same circuit board as the multiple device slave arbitrator that it serves. For example, a first mirrored write arbitrator exists on the first circuit board as an external arbitrator to the first multiple device slave arbitrator. The purpose of the first mirrored write arbitrator is to obtain access to the second cache memory so the first multiple device slave arbitrator can perform a mirrored write to the first cache memory and the second cache memory simultaneously. Correspondingly, a second mirrored write arbitrator exists on the second circuit board as an external arbitrator to the second multiple device slave arbitrator. The purpose of the second mirrored write arbitrator is to obtain access to the first cache memory so the second multiple device slave arbitrator can perform a mirrored write to the first cache memory and the second cache memory simultaneously.

Additional features and details of the enhanced multiple client memory arbitration system of the present invention are disclosed and claimed in the remaining sections of this document.

DETAILED DESCRIPTION

Figure 1:
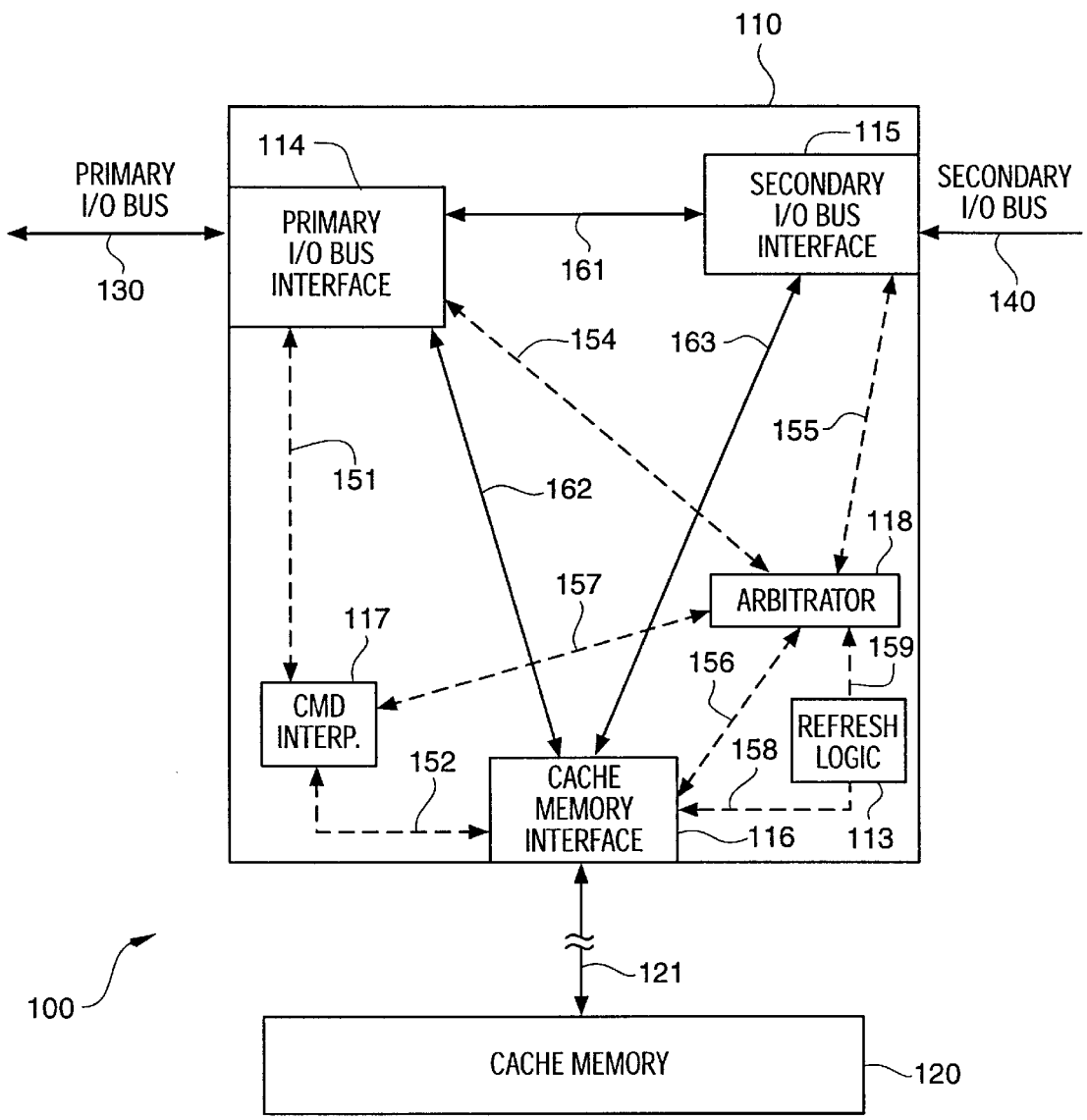
FIG. 1 illustrates a system level example of an arbitration device for multiple clients in an I/O bus bridge environment between a primary I/O bus and a secondary I/O bus.

Single Device Arbitration Implementation—FIG. 1

FIG. 1 illustrates a system level block diagram of an I/O controller configuration 100. The I/O controller configuration 100 includes an I/O bus bridge 110 that contains an arbitration device 118 that is the focus of the present invention. In one preferred embodiment, the multiple client memory arbitration system of the present invention is embodied in an I/O bus bridge. However, an I/O bus bridge is only one example of a device where multiple internal and/or external clients share a single cache or cache memory. Illustrating the present invention in the context of an I/O bus bridge implementation is for preferred embodiment and best mode illustration purposes only and is not a limitation on the applicability of the underlying invention as claimed to other memory arbitration applications.

An I/O bus bridge is an interface bridge that joins two I/O busses. The bridge is typically an integrated circuit implementation that supports a high-speed data path between two independent I/O busses and whose primary function is to transfer data between to the two I/O busses. Other more generic names for I/O buses can include expansion bus, channel, and I/O channel. An I/O bus itself is a high-speed data path between at least two components in a computing system.

The I/O bus bridge 110 includes a primary I/O bus interface 114 to a primary I/O bus 130 and a secondary I/O bus interface 115 to a secondary I/O bus 140. The primary I/O bus interface 114 can also include or supply control access to a high-level embedded CPU or bridge controller whose function is to identify and coordinate simultaneous I/O transactions across the I/O bus bridge 110 and to communicate read/write commands to command interpreter 117 for actual read/write control of data to and from cache memory 120. Both I/O bus interfaces 114–115 provide write posting and read pre-fetching buffers for all bridge transactions to facilitate coherency and consistency of bidirectional transactions across the I/O bus bridge 110.

Command path 161 connects the primary bus interface 114 and the secondary bus interface 115. The command path 161 carries the read/write transmission information only between the primary I/O bus 130 and the secondary I/O bus 140. First data path 162 and second data path 163 connect a cache memory interface 116 to the primary bus interface 114 and the second bus interface 115 respectively. The first data path 162 and second data path 163 carry the data only for each read/write transmission between the primary I/O bus 130 and the secondary I/O bus 140 by way of the cache memory 120. Although the first data path 162 and second data path 163 are ideally the same word-size as the attached busses 130 and 140, the first data path 162 and the second data path 163 can independently buffer incoming data from the respective busses as needed to facilitate the most efficient write operation of a burst of incoming data to cache memory 120.

One important aspect of the I/O bus bridge 110 is that the first data path 162 and second data path 163 are independent read/write paths to and from cache memory 120 by way of cache memory interface 116. Dual port access to cache memory 120 facilitates concurrent reads and writes to and from cache memory interface 116 at a bandwidth capacity that is at least equal to the bandwidth B of the attached busses and can be as efficient as 2B or 4B beyond the bandwidth capacity of the attached busses.

I/O bus bridge 110 is a multipurpose memory interface that primarily supports dual port simultaneous independent read/write memory access to cache memory 120. The cache memory interface 116 takes timing off an independent memory clock and operates asynchronously with respect to primary I/O bus 130 and secondary I/O bus 140 sides. The interface can be one of the points of support for fault tolerant features including battery backup as needed for primary power failures. The cache memory interface 116 in the preferred embodiment supports Error Correction Coding (ECC) and a shadow memory bank option.

Cache memory 120 can be any standard off-the-shelf synchronous data memory bank that is either internal or external to I/O bus bridge 110 and is operatively connected to the I/O bus bridge 110 by memory bus 121. In the single device configuration 100 of the present illustration, whether the cache memory 120 is internal or external to I/O bus bridge 110, the cache memory 120 is considered local to the I/O bus bridge 110 and is subject to internal client access as determined by arbitrator 118. In the preferred embodiment, cache memory 120 is an Error Correction Code (ECC) Dynamic Random Access Memory (DRAM), preferably a Synchronous DRAM (SDRAM) 8 byte/72 bit Dual In-line Memory Module (DIMM) memory.

The command interpreter 117, also known as the command sequence controller or command executor, executes memory access commands for the I/O bus bridge 110. Command paths 151 and 152 facilitate command communication between the cache memory interface 116 and the I/O busses 130 and 140.

A single arbitration device 118, also known as an arbitration controller or arbitrator, is a device internal to the I/O bus bridge 110 that arbitrates access to cache memory 120 among a plurality of internal clients and at least one external client. The internal clients include, but are not limited to, the primary I/O bus interface 114, secondary I/O bus interface 115, command interpreter 117, cache memory interface 116, and memory refresh logic 113. Each of the internal clients 113–117 share access to cache memory 120 according to the arbitration logic of arbitration device 118. An introduction to external client details are disclosed in the text accompanying FIGS. 2–4.

Each internal client 113–117 is operatively connected to arbitration device 118 by arbitration signal leads 154–157 and 159. The memory refresh logic internal client 113 is also operatively connected to cache memory interface 116 by way of refresh control lead 158. Each arbitration signal lead 154–157 and 159 includes at least one signal lead that can carry signals such as a request signal REQ, a grant signal GNT, and a burst count signal COUNT[n:0]. A REQ signal is an input to the arbitration device 118 from a given internal client and the signal is enabled for the duration of time an internal client is requesting access to cache memory 120. A GNT signal is an output from the arbitration device 118 to a given internal client and the signal is enabled when the internal client is granted access to cache memory 120. The COUNT signal is an input to the arbitration device 118 from a given internal client such as the cache memory interface 116, and the signal is used to specify the number of memory transfers required by a given internal client. A memory transfer is a single read/write operation to/from the cache memory 120. The count value can be changed dynamically as the client's internal buffers are being emptied by the cache memory interface 116 concurrently with being filled by either the primary I/O bus interface 114 or the secondary I/O bus interface 115. Once the count value falls below the cache memory transfer latency value that was previously communicated to the arbitration device 118 from the cache memory 120, the client's access to the cache memory 120 is terminated even if the client's burst count has not reached zero.

Figure 2:
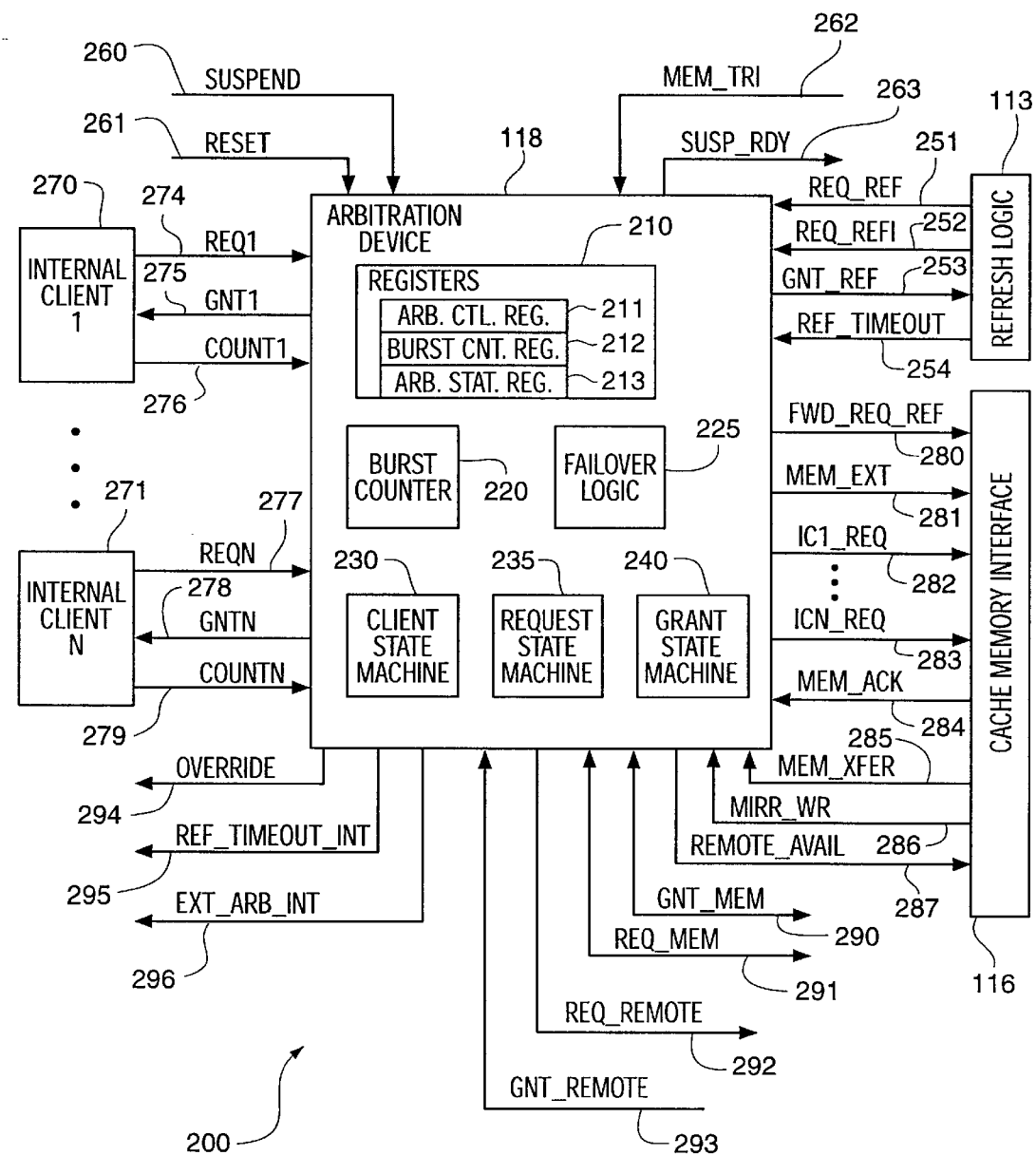
FIG. 2 illustrates architectural details of an enhanced arbitration device in block diagram form.

Enhanced Arbitration Device Architecture—FIG. 2

FIG. 2 illustrates an architectural overview 200 of the enhanced multiple client memory arbitration device 118 in block diagram form. The various components and signal leads illustrated in architectural overview 200 exist for any arbitration device 118 regardless of its operational configuration as a master or a slave arbitrator for example. However, certain of the components and/or signal leads are present but may or may not be used depending on the configuration type selected for a given arbitrator and depending on whether the arbitrator is an enhanced or non-enhanced arbitration device. In summary, an enhanced arbitration device 118 is one that includes the registers and/or gated logic to support the use of the signal leads that include, but are not limited to, REQ_REMOTE 292, GNT_REMOTE 293, MIRR_WR 286, and REMOTE_AVAIL 287. Any reference to a basic or non-enhanced arbitrator, arbitration device, or arbitration system means the arbitration device disclosed in the text accompanying FIG. 2 absent the REQ_REMOTE 292, GNT_REMOTE 293, MIRR_WR 286, and REMOTE_AVAIL 287 signal leads.

The arbitration device 118 itself is a logic engine comprised of registers and gated logic that are also referred to as components and/or logic blocks. Key components and/or logic blocks of arbitration device 118 include registers 210, burst counter 220, failover logic 225, client state machine 230, request state machine 235, and grant state machine 240. Registers 210 includes hardware registers 211–213 for use as arbitration device control and/or status. The arbitration control register 211 contains configuration and timing information including, but not limited to, a suspend enable bit, an asynchronous external interface bit, an external pulse width field, a failover enable bit, and a configuration field. The suspend enable bit is used to indicate whether or not to place the cache memory 120 in power down mode in situations such as when a primary power supply to the I/O controller 110 itself has been lost. The asynchronous external interface bit is used to determine whether the arbitration signals received from an external arbitration device must pass through synchronization logic of arbitration device 118 prior to use by the arbitration device 118. The external pulse width field is used to determine the minimum pulse width in clock cycles for the most reliable signal from an external interface or device. That is, the external pulse width field defines the minimum number of clock cycles that should occur between two individual like type external interface signals to maximize reliable detection between the signal being enabled a first time from a second or subsequent times. The actual width of a pulse is measured from the falling edge of the signal to the subsequent rising edge of the same signal. The failover enable bit is used to signal the need for a master or slave configured arbitration device 118 to execute failover procedures. The configuration field defines the present device configuration by a unique combination of bits in the field. Configuration types include, but are not limited to, an unknown device, single device, multiple device master, and multiple device slave.

The burst count register 212 contains programmable burst count values for certain of the internal clients served by the arbitration device 118. A burst count is the number of words transferred during a single cycle when a client is granted access to the cache memory 120.

The arbitration status register 213 contains status and/or diagnostic information for the arbitration device 118 that includes, but is not limited to, a suspend status bit, a failover status bit, and an actual configuration field. The suspend status bit is used to indicate the completion or failure to complete a suspend operation due to the suspend bit in the arbitration control register 213. The failover status bit is used to indicate the completion or failure to complete a failover operation due to the failover bit in the arbitration control register 213. The actual configuration field is used to identify the present configuration of arbitration device 118. The actual configuration field of the arbitration status register 211 is typically identical to the configuration field of the arbitration control register 213 except after a failover has occurred when the configuration field of the arbitration control register 213 reflects the configuration prior to failover and the actual configuration field of the arbitration status register 211 reflects the configuration following failover.

The burst counter 220 contains the gated logic and circuitry necessary to count the number of data transfers that occur between a given client and the cache memory 120. Default limits can be set for the number of data transfers a given client can have at a given time, however, certain internal clients can have programmable burst limits that are different from the default limit as previously disclosed in the text relating to the programmable burst count register 212. Prior to a typical internal client proceeding with a cache memory 120 access, the burst counter 220 is loaded with a value from the burst count register 212 that corresponds to the burst count for the given client. As the client's data transfer to or from cache memory 120 proceeds, the burst counter 220 decrements the client's burst count so that the arbitration device 118 knows when the cache memory 120 access for that client must terminate. The transmitting client is terminated when the burst count falls below the latency county supplied by the cache memory interface 116. In the mean time while the present client has access to cache memory 120, the arbitration device 118 proceeds to identify and prepare for the next client that is requesting access to cache memory 120. Note, however, that refresh clients are internal clients that access cache memory 120 without burst counter 220 involvement. The refresh logic 250 that plays the dual role of normal refresh client REF and the refresh immediate client REFI have no need for a burst count because a refresh operation is allowed to take whatever time is required to complete successfully.

The failover logic block 225 contains the gated logic and circuitry necessary to detect and execute a failover operation of a type that can include either an active/passive failover or an active/active failover. An active/passive failover occurs in a configuration having master and dependent slave arbitration devices where one device is active and the other device is passive but ready to take control. Events that are sufficient to result in an active/passive failover include, but are not limited to, where an external arbitration device prevents proper cache memory 120 refresh operations from being performed, or where an internal or external client is maintaining control of the cache memory interface 116 for a longer than permitted period of time, or if an external master arbitrator fails to grant cache memory 120 access to a slave arbitration device for a longer than permitted period of time. Each of these conditions are detected by determining that refresh operations have not occurred within an appropriate amount of time. Once a failure to refresh memory is detected, the refresh logic 250 notifies the arbitration device 118 of the timeout and the arbitration device 118 executes the active/passive failover.

An active/active failover occurs in a configuration having redundant slave arbitration devices that are sharing a workload and engaged in memory mirroring across respective cache memories on each of a redundant pair of circuit boards in a fault tolerant configuration. One example of a redundant circuit board fault tolerant configuration where active/active failover could occur is disclosed in the text accompanying FIG. 14. Once a failure to refresh memory or other failure to respond occurs as between two redundant slave arbitration devices, tasks previously performed by the failed arbitration device are transferred to the healthy arbitration device by an active/active failover.

The arbitration device 118 contains the gated logic and circuitry necessary to execute several cooperatively interacting state machines including, but not limited to, a client state machine 230, a request state machine 235, and a grant state machine 240. The client state machine 230 is a part of the arbitration device engine that determines the order in which the multiple clients of arbitration device 118 will receive access to cache memory 120. The request state machine 235 is a part of the arbitration device engine that forwards client requests for access to a local cache memory, such as cache memory 120, from the arbitration device 118 to the cache memory interface 116. The request state machine 235 also forwards requests for access to a remote cache memory for memory mirroring purposes when the need for memory mirrored write operations are identified by the cache memory interface 116. The grant state machine 240 is a part of the arbitration device engine that delivers the grant of access to cache memory 120 from the cache memory interface 116 to client receiving the access. Note that although multiple internal and external clients may be requesting access to cache memory 120 concurrently, only one client receives access to cache memory 120 at a time.

The arbitration device 118 is operatively connected to n internal clients 270–271 respectively by way of signal leads that are unique to each client including, but not limited to, a request signal lead REQ, grant signal lead GNT, and burst count signal lead COUNT 274–276 and 277–279 respectively. Arbitration device 118 is also operatively connected to the refresh logic engine 113 and cache memory interface 116. Signal leads between refresh logic engine 113 and arbitration device 118 include, but are not limited to, request normal refresh signal lead REQ_REF 251, request refresh immediate signal lead REQ_REFI 252, grant refresh signal lead GNT_REF 253, and refresh timeout signal lead REF_TIMEOUT 254. The REQ_REF signal lead 251 is used to communicate the need for access to cache memory 120 for a normal memory refresh operation. The REQ_REFI signal lead 252 is used to communicate the need for access to cache memory 120 for an immediate memory refresh operation. The GNT_REF signal lead 253 is used to communicate that access to cache memory 120 is granted to the refresh logic engine 113. The REF_TIMEOUT signal lead 254 is used to communicate to the arbitration device 118 that a predetermined amount of time has elapsed since the last memory refresh operation.

Signal leads between arbitration device 118 and cache memory interface 116 include, but are not limited to, a forwarded refresh request FWD_REQ_REF 280 on behalf of the refresh logic engine 113, a forwarded external memory request MEM_EXT 281 on behalf of an external client, an internal client memory request IC_REQ 282–283 on behalf of individual ones of the internal clients 270–271, memory access acknowledgment MEM_ACK 284 used to acknowledge receipt of a request for access to cache memory 120 from any client, and memory transfer signal lead MEM_XFER 285. Additional signal leads for use in mirrored write operations include a mirrored write signal lead MIRR_WR 286 used by the cache memory interface 116 to communicate to the arbitration device 118 the need for mirrored write access to a remote cache memory, and a remote cache memory available signal lead REMOTE_AVAIL 287 used by the arbitration device 118 to notify the cache memory interface 116 of the availability of the requested remote cache memory for a mirrored write operation. Signal leads between an arbitration device 118 configured as a basic master/slave with an arbitrator that is external to arbitration device 118 include, but are not limited to, a grant memory access signal lead GNT_MEM 290 used by the arbitration device 118 to signal the grant of cache memory 120 access to an external client, and a request memory access signal lead REQ_MEM 291 used by an external client to signal a request for access to cache memory 120. Additional signal leads from arbitration device 118 to an external arbitrator include, but are not limited to, an override signal lead OVERRIDE 294 to signal an external arbitrator to shut off during a failover operation, a refresh timeout interrupt signal lead REF_TIMEOUT_INT 295 to signal a refresh timeout error, and an external arbitrator error interrupt signal lead EXT_ARB_ERR_INT 296 to signal an external arbitrator error. Additional signal leads between an enhanced arbitration device 118 and a mirrored write arbitrator include, but are not limited to, a signal lead to request remote cache memory access REQ_REMOTE 292, and a signal lead to communicate the grant of a requested remote cache memory access GNT_REMOTE 293 for a mirrored write operation. Note that a mirrored write arbitrator is not necessarily an arbitration device of the exact configuration disclosed in the text accompanying FIG. 2.

The suspend signal lead SUSPEND 260 is used by a high level host system to signal the arbitration device 118 the immanence of a power failure. The reset signal lead RESET 261 is used by a host of the arbitration device 118 to signal the arbitration device 118 to come out of a suspend state. The suspend ready signal lead SUSP_RDY 263 signals the cache memory interface 116 and the internal clients 270–271 that it is time to enter the suspend state due to a power failure. The memory tri-state signal lead MEM_TRI 262 is the override input to arbitration device 118 from an external master/slave configured arbitrator.

Figure 3:
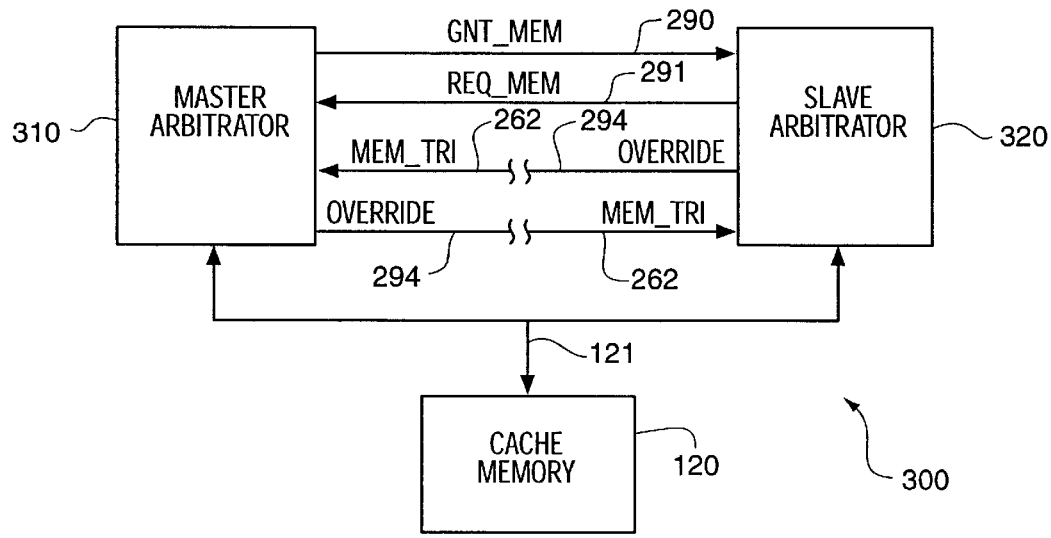
FIG. 3 illustrates a basic multiple arbitration device configuration in a master and dependent slave block diagram.
Figure 4:
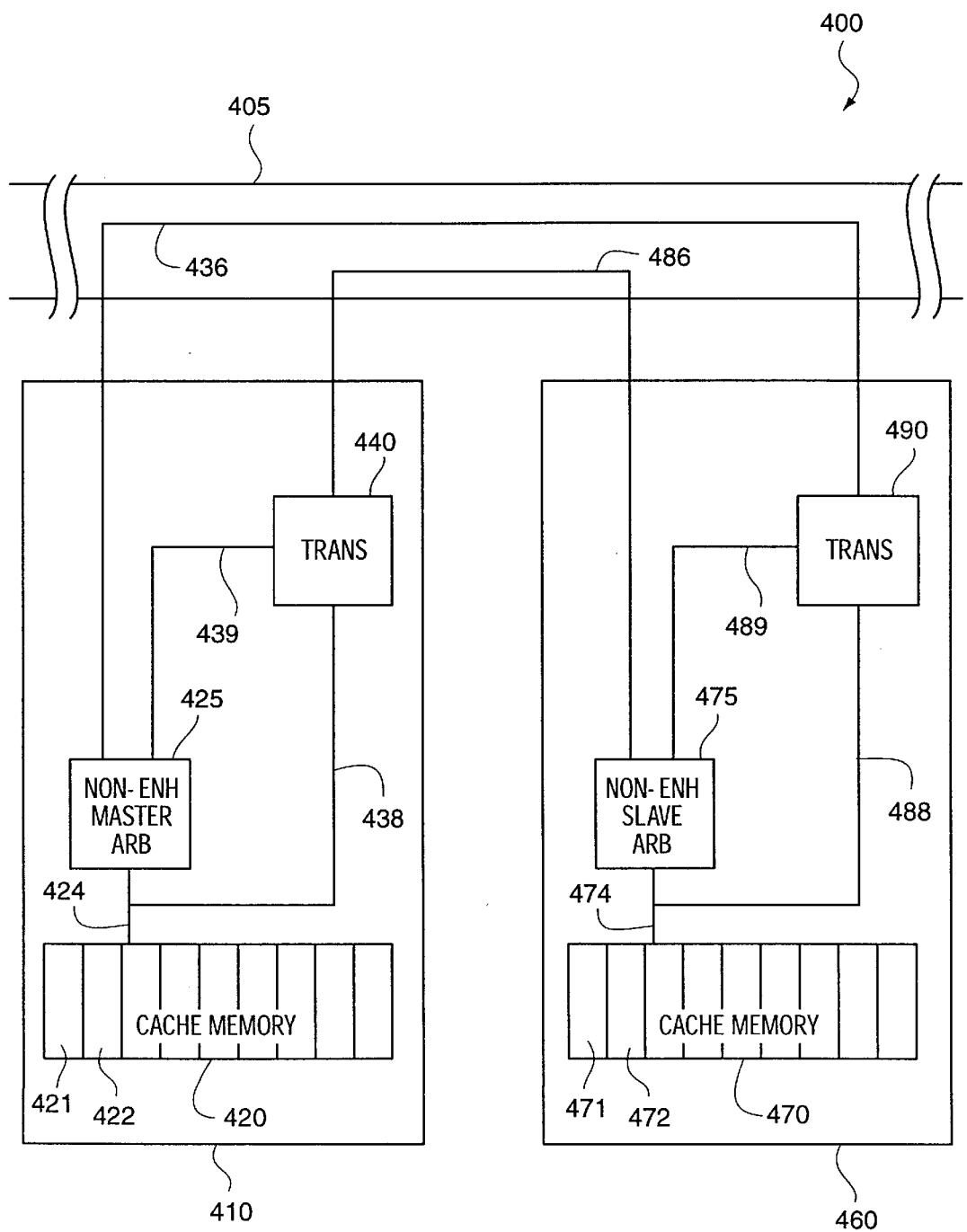
FIG. 4 illustrates a first mirrored write implementation example based on the basic non-enhanced arbitration device architecture.
Figure 14:
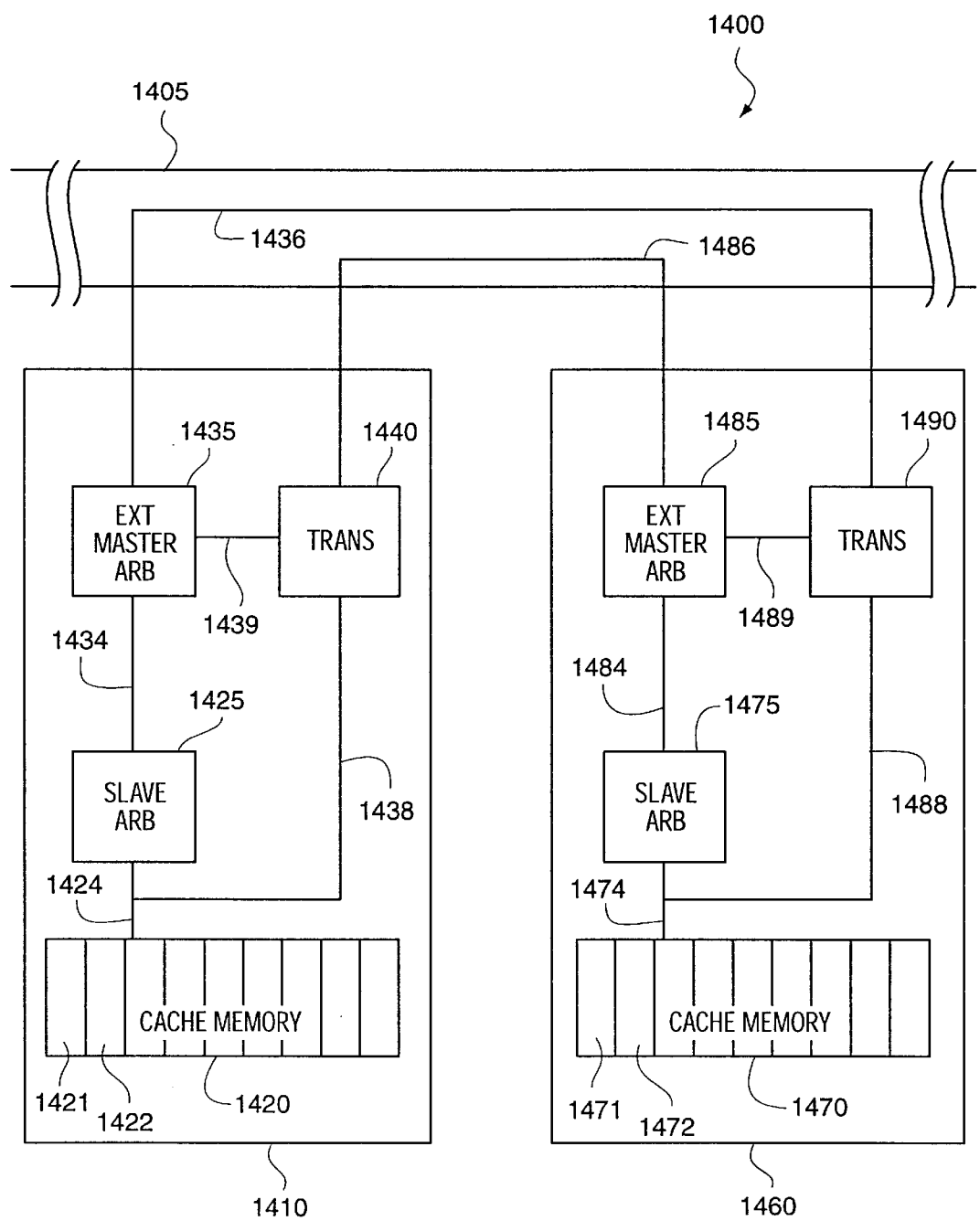
FIG. 14 illustrates a second mirrored write implementation example based on the enhanced arbitration device architecture.

Arbitration Device Configurations and Mirrored Writes—FIGS. 3–4 and 14

The multiple client arbitration device 118 having the arbitration device architecture as disclosed in the text accompanying FIG. 2, can be configured as a single stand-alone arbitration device that serves only internal clients as illustrated in FIG. 1. However, the same multiple client arbitration device 118 having the enhanced arbitration device architecture as disclosed in the text accompanying FIG. 2, can be configured as either a master arbitrator or a dependent slave arbitrator as disclosed in the text accompanying FIGS. 3–4, or as a multi-device slave arbitrator as disclosed in the text accompanying FIG. 14. Note that in a preferred embodiment, based on the arbitration device architecture as disclosed in the text accompanying FIG. 2, that a multiple client arbitration device 118 configured as a master arbitrator means that only one slave arbitrator can be accommodated as an external client by the master arbitrator due to the single pair of external device grant and request signal leads. Additional pairs of signal leads, namely the GNT_MEM 290 and REQ_MEM 291 signal leads, are required for a master arbitrator of the FIG. 2 architecture to accommodate multiple slave arbitration devices.

FIG. 3 illustrates a basic master/slave arbitration configuration 300 where the master arbitrator 310 and the dependent slave arbitrator 320 are both of the arbitration device architecture disclosed in the text accompanying FIG. 2. The master arbitrator 310 and slave arbitrator 320 each have their own cache memory interfaces and share access to a single cache memory 120 by way of memory bus 121. The slave arbitrator 320 communicates a request for memory access to the master arbitrator 310 by way of REQ_MEM signal lead 291. Similarly, the master arbitrator 310 communicates a grant of memory access to the slave arbitrator 320 by way of GNT-MEM signal lead 290. Both arbitration devices 310 and 320 have an outgoing OVERRIDE signal lead 294 and incoming MEM_TRI signal lead 262 for failover purposes as previously disclosed in the text accompanying FIG. 2. These basic signal leads provide adequate communication between the master arbitrator 310 and slave arbitrator 320 so that both devices can function as a coherent system of multiple clients sharing a single cache memory 120. However, one requirement of the slave arbitrator 320 is that each time the slave arbitrator 320 is granted access to cache memory 120, each internal client of the slave arbitrator 320 can access the cache memory only once prior to the slave arbitrator 320 disabling the request signal on the REQ_MEM signal lead 291 regardless of whether additional internal client requests are pending. Requiring that the request signal be disabled in this manner is one way to prevent the slave arbitrator 320 from locking out the master arbitrator 310 from access to cache memory 120. After disabling the request signal on the REQ_MEM signal lead 291 for the minimum time specified in the arbitration control register 211, the slave arbitrator 320 can immediately enable the request signal on the REQ_MEM signal lead 291 as needed to gain access to cache memory 120 once again.

FIG. 4 illustrates an example of a basic mirrored write implementation 400 that is based on a non-enhanced master arbitrator 425 and a non-enhanced slave arbitrator 475 of the non-enhanced arbitration device architecture type disclosed in the text accompanying FIG. 2. The basic mirrored write implementation 400 includes dual or redundant expansion circuit boards in a system where components on the first expansion circuit board 410 communicate with components on the second expansion circuit board 460 by way of a back plane 405. One purpose of having identical expansion circuit boards is for redundancy or fault tolerance so that if one circuit board failed the second circuit board can continue in its place without interrupting any service provided. In the basic mirrored write implementation 400, the master arbitrator 425 on the first expansion circuit board 410 is the active arbitrator for whatever service or feature that is being provided, and the slave arbitrator 475 on the second expansion circuit board 460 is the passive arbitrator that is ready to take over the tasks of the master arbitrator 425 in a failover operation should the master arbitrator 425 fail. The mirrored write feature of the basic mirrored write implementation 400 means that an active arbitrator can write to two cache memories simultaneously so that the active arbitrators cache memory and the passive arbitrator's cache memory both contain critical pieces of data that enable the passive arbitrator to take over the active arbitrator's tasks in a failover operation. The mirrored write feature is disclosed in more detail below.

Additional components on the first expansion circuit board 410 and the second expansion circuit board 460 include, but are not limited to, a first transceiver 440, a second transceiver 490, a first cache memory 420, and a second cache memory 470 respectively. The master arbitration device 425 is operatively connected to the first cache memory 420 by way of cache memory signal lead 424 and to the first transceiver 440 by way of first transceiver lead 439. The master arbitrator 425 is also operatively connected to the second cache memory 470 by way of back plane lead 436 to the second transceiver 490 and second transceiver memory lead 488. Similarly, the slave arbitration device 475 is operatively connected to the second cache memory 470 by way of cache memory signal lead 474 and to the second transceiver 490 by way of second transceiver lead 489. The slave arbitrator 475 is also operatively connected to the first cache memory 420 by way of back plane lead 486 to the first transceiver 440 and first transceiver memory lead 438.

The function of the first transceiver 440 and second transceiver 490 is to control the write path access to the respective cache memories 420 and 470 so that only one device can write to the cache memories 420 and 470 at a time. For a typical write operation, the master arbitrator 425 will only write to the first cache memory 420. However, for a mirrored write operation, the master arbitrator 425 writes to the first cache memory 420 while simultaneously writing to the same memory location on the same memory module in the second cache memory 470. Note that to support mirrored write transactions, the mirrored write portions of both cache memories 420 and 470 are identical memory devices in identical memory module order. If both cache memories 420 and 470 are DIMM's then a write to the first DIMM 421 in the first cache memory 420 means that the same data is also written to the first DIMM 471 in the second cache memory 470. The type of data typically mirrored includes, but is not limited to meta-data or control data of the type that describes or controls actual user data or determines what is going to happen with what actual user data as in Command Interpreter type instruction data. Having control type meta-data mirrored facilitates the transfer of operational tasks of a failed active arbitrator to a healthy passive arbitrator in a failover operation.

Although the basic mirrored write implementation 400 is fully functional even with using non-enhanced arbitration devices, the basic mirrored write implementation 400 is not the preferred embodiment primarily because only the first expansion circuit board 410 is actively performing work while the second expansion circuit board 460 is effectively idle. Thus, the basic mirrored write implementation 400, in the context of an I/O bus bridge, would be a limitation on the bridge throughput even though the configuration supports the desirable features of fault tolerance and remote mirrored writes. The text accompanying FIG. 14 illustrates a preferred embodiment of the enhanced mirrored write implementation 1400 that includes the enhanced arbitration device architecture disclosed in FIG. 2.

FIG. 14 illustrates an enhanced mirrored write implementation 1400 that uses an enhanced master arbitrator 1425 and an enhanced slave arbitrator 1475 of the enhanced arbitration device architecture type disclosed in the text accompanying FIG. 2. One primary purpose of the dual board configuration and mirrored write functionality in the enhanced mirrored write implementation 1400 is for fault tolerance purposes to limit the points of failure in a critical system. However, the fundamental difference in the enhanced mirrored write implementation 1400 is that the components on the first expansion circuit board 1410 and the components on the second expansion circuit board 1460 are identical and can share equally in the work load as active devices performing work simultaneously. Thus, the enhanced mirrored write implementation 1400 in an I/O bus bridge configuration can perform at or about twice the work of the basic mirrored write implementation 400 disclosed in FIG. 4 given the same amount of time. For this reason, additional board level components and component configurations exist in the enhanced mirrored write implementation 1400 as disclosed below. The redundant circuit boards of the enhanced mirrored write configuration 1400 in FIG. 14 can be identical expansion circuit boards in a PC where components on the first expansion circuit board 1410 communicate with components on the second expansion circuit board 1460 by way of a back plane 1405. Components on the first expansion circuit board 1410 and the second expansion circuit board 1460 are substantially identical and respectively include, but are not limited to, a first enhanced slave arbitrator 1425, a first mirrored write arbitrator 1434, a first transceiver 1440, and a first cache memory 1420 on the first expansion circuit board 1410, and a second enhanced slave arbitrator 1475, a second mirrored write arbitrator 1484, a second transceiver 1490, and a second cache memory 1470 on the second expansion circuit board 1460. The first enhanced slave arbitrator 1425 and second enhanced slave arbitrator 1475 are both configured as a multi-device slaves. The first mirrored write arbitrator 1434 and the second mirrored write arbitrator 1484 both serve the sole purpose of arbitrating for access to the other's cache memory for purposes of performing mirrored write operations as disclosed in greater detail below.

The first enhanced slave arbitrator 1425 is operatively connected to the first cache memory 1420 by way of fist cache memory signal lead 1424. The first mirrored write arbitrator 1435 is operatively connected to first enhanced slave arbitrator 1424 by way of master/slave signal lead 1434, and to the first transceiver 1440 by way of a first transceiver signal lead 1439. In addition, the first mirrored write arbitrator 1435 is operatively connected to the second transceiver 1490 on the second expansion circuit board 1460 by way of a first back plane signal lead 1436. The first transceiver 1440 is also operatively connected to the first cache memory 1420 by way of first transceiver/memory signal lead 1438, and to the second mirrored write arbitrator 1485 by way of a second master/transceiver signal lead 1486. Similarly, the second enhanced slave arbitrator 1475 is operatively connected to the second cache memory 1470 by way of second cache memory signal lead 1474. The second mirrored write arbitrator 1485 is operatively connected to second enhanced slave arbitrator 1475 by way of master/slave signal lead 1484, and to the second transceiver 1490 by way of a second transceiver signal lead 1489. In addition, the second mirrored write arbitrator 1485 is operatively connected to the first transceiver 1440 on the first expansion circuit board 1410 by way of a second back plane signal lead 1486. The second transceiver 1490 is also operatively connected to the second cache memory 1470 by way of second transceiver/memory signal lead 1488, and to the first mirrored write arbitrator 1435 by way of a first master/transceiver signal lead 1436.

The function of the transceivers 1440 and 1490 is to control the simultaneous write path access to the respective cache memories 1420 and 1470 so that only one arbitrator can write to both memories at one time. The function of the mirrored write arbitrators 1435 and 1485 is to arbitrate access to the respective remote cache memories 1420 and 1470 for purposes of a mirrored write operation by one or the other of the enhanced slave arbitrators 1425 or 1475. The function of the enhanced slave arbitrators 1425 and 1475 is to act as the focal point of all arbitration activities on behalf of clients on the respective boards.

One key to the successful mirrored write operations of an enhanced slave arbitrator are the REQ_REMOTE 293 and GNT_REMOTE 292 signal leads previously disclosed in the text accompanying FIG. 2. The REQ_REMOTE 293 and GNT_REMOTE 292 signal leads are used to communicate the request and grant of access to a remote cache memory as between an enhanced slave arbitrator and a mirrored write arbitrator. Access to a cache memory local to an enhanced slave arbitrator is requested by a signal on the REQ_MEM signal lead 291 as previously disclosed. Specifically, from the perspective of the enhanced slave arbitrator 1425, a mirrored write operation occurs when a write request from a client is communicated from the enhanced slave arbitrator 1425 to its cache memory interface 116 by enabling a signal on one of the lCx_REQ signal leads 282–283. The cache memory interface 116 determines that it is necessary for this particular write to be a mirrored write so that an acknowledgment is returned from the cache memory interface 116 to the enhanced arbitrator 1425 on the MIRR_WR signal lead 286. A signal on the MIRR_WR signal lead 286 tells the enhanced slave arbitrator 1425 that the first cache memory 1420 is available but that access to the second cache memory 1470 is required to complete a mirrored write operation. The enhanced slave arbitrator 1425 requests access to the second cache memory 1470 by a signal on the REQ_REMOTE signal lead 292 to the first mirrored write arbitrator 1435 who forwards the request to the second mirrored write arbitrator 1485. When the mirrored write arbitrators 1435 and 1485 determine that the second cache memory 1470 is available, the first mirrored write arbitrator 1435 signals the first enhanced slave arbitrator 1425 that access to the second cache memory 1470 is granted by way of the GNT_REMOTE signal lead 293. The first enhanced slave arbitrator 1425 forwards the grant signal to its cache memory interface 116 on the REMOTE_AVAIL signal lead 287, and the cache memory interface 116 performs the mirrored write operation. Key to a successful remote mirrored write operation is that both a remote cache memory and the local cache memory are accessible at the same time for a simultaneous write operation. Any performance impact that may exist due to the time required to obtain access to both the local and remote cache memories for a mirrored write, are mitigated by the facts that not every write operation is a mirrored write, and that both circuit boards 1410 and 1460 are sharing the active workload under normal processing conditions where both boards are active. In the event one of the two active circuit boards 1410 or 1460 should fail, the remaining healthy arbitrator and its circuit board carry the entire workload previously shared by both arbitrators and circuit boards.

One mirrored write caution does exist. A deadlock situation can occur if two arbitration devices are attempting mirrored write operations to the other's cache memory at the same time. More specifically, if two arbitration devices 1425 and 1475 have internal client requests pending, both arbitration devices will enable their REQ_MEM 291 signal leads to gain control of their local cache memories 1420 and 1470 respectively. If the requests occur at substantially the same time then the respective master arbitrators 1435 and 1485 will grant the requests by enabling each requesting devices GNT_MEM signal lead 290. Both arbitration devices 1425 and 1475 now have access to their respective local cache memories 1420 and 1470. However, if arbitration devices 1425 and 1475 subsequently discover that their respective internal clients both require a mirrored write, then both arbitration devices 1425 and 1475 enable their REQ_REMOTE signal leads 292 to request remote access to the other's cache memory 1470 and 1420 respectively. A deadlock results because both arbitration devices 1425 and 1475 have been granted access to their respective local cache memories 1420 and 1470 yet both arbitration devices 1425 and 1475 are willing to wait forever for the other to relinquish control of their local cache memory 1420 or 1470 so that one of the two arbitrators 1425 or 1475 can be granted remote cache memory access.

To prevent the deadlock discussed above, one of the two redundant circuit boards 1410 or 1460 is designated as the primary board that will take the lead in determine which board will defer to the other toward resolving deadlock situations. Normally, a master arbitrator 1435 would not disable a signal on the GNT_MEM signal lead 290 until the slave arbitration device 1425 disabled its signal on the REQ_MEM signal lead 291. However, it is safe and desirable in the present situation for the master arbitrator 1435 to disable its signal on the GNT_MEM signal lead 290 because the slave arbitration device 1425 is unable to perform any other transactions while it is waiting for a signal on the GNT_REMOTE signal lead 293. Thus, if in a mirrored write situation, for example, the master arbitrator 1435 routinely disables its signal on the GNT_MEM signal lead 290, and the slave arbitrator 1425 is held off from accessing cache memory 1420 by tri-stating the cache memory interface lead 1424 from the time a signal is enabled on the MIRR_WR signal lead 286 until the time a signal is enabled on the REMOTE_AVAIL signal lead 287, then a mirrored write deadlock situation is avoided while the slave arbitrator 1475 is granted remote access to cache memory 1420 without conflict.

Figure 5:
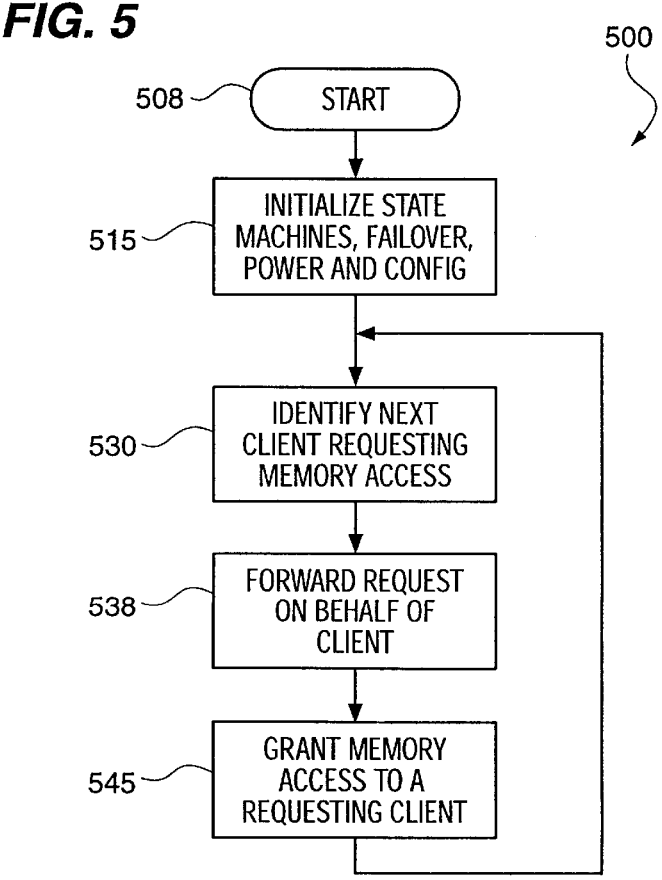
FIG. 5 illustrates an overview of the multiple client memory arbitration system operational steps in flow diagram form.
Figure 6:
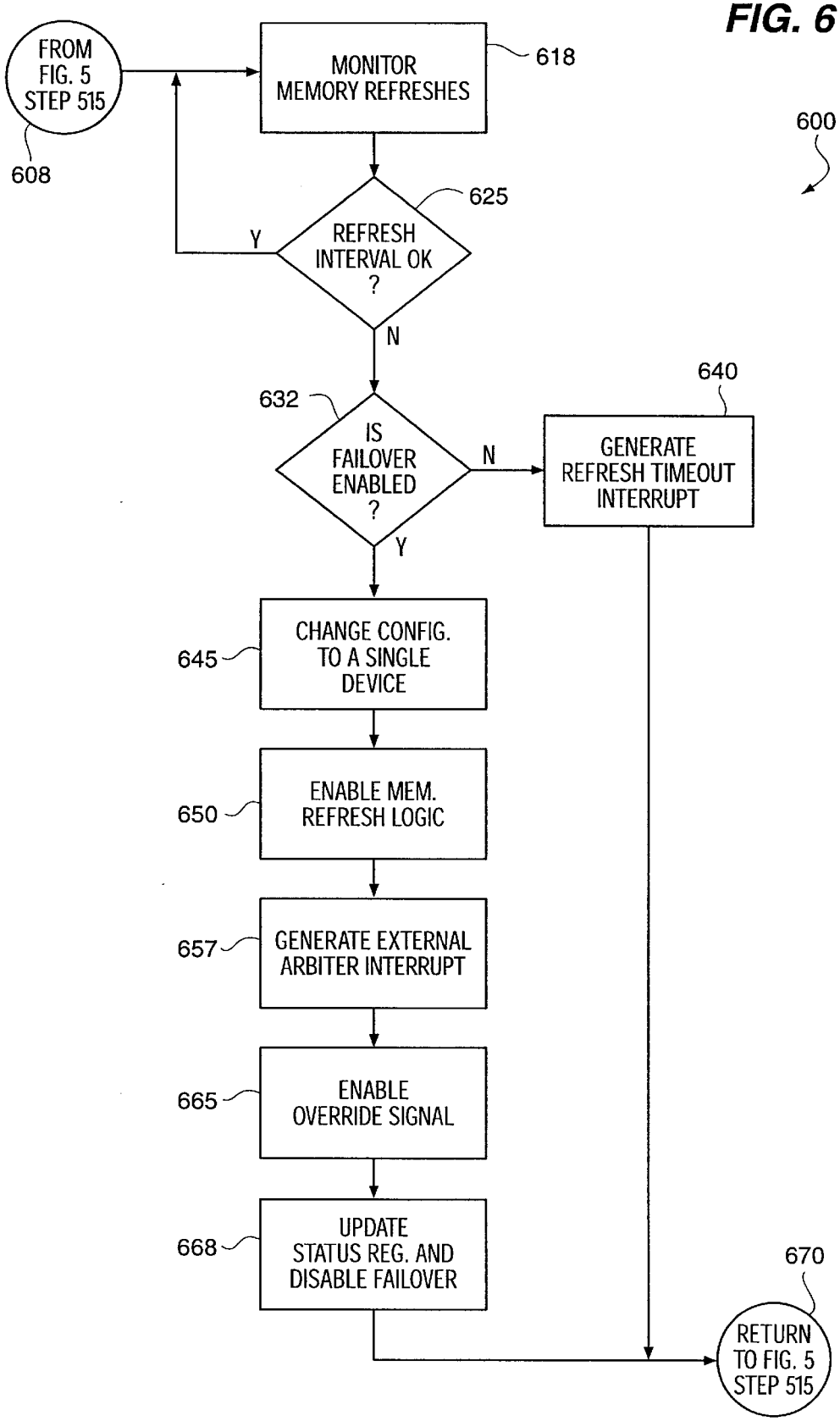
FIG. 6 illustrates details of the failover system operational steps in flow diagram form.
Figure 7:
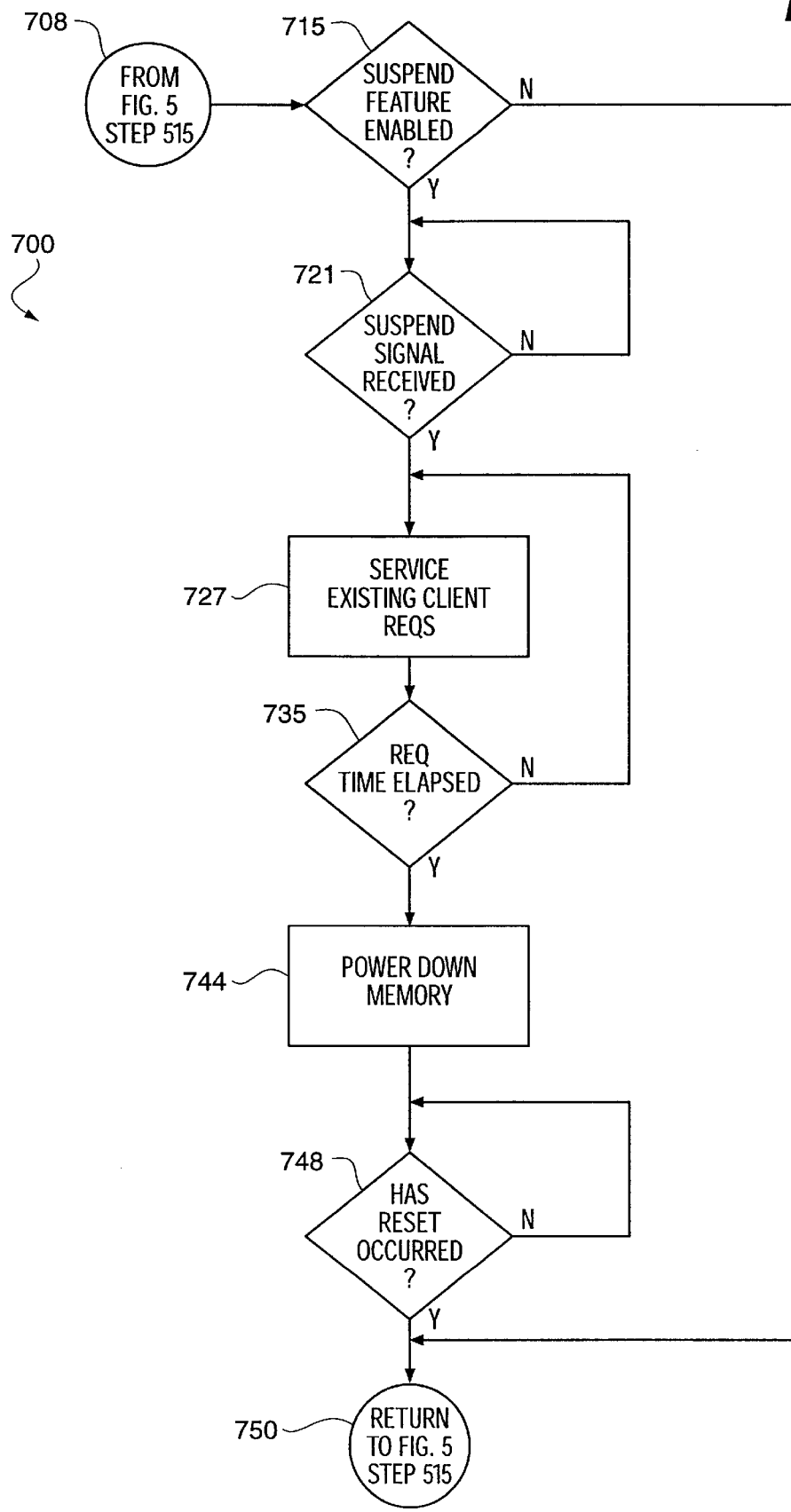
FIG. 7 illustrates details of the power failure detection and suspend procedures operational steps in flow diagram form.

Arbitration Device Operational Overviews—FIGS. 5–7

FIG. 5 illustrates an operational overview 500 for the arbitration device 118 in flow diagram form. The operational overview 500 begins at step 508 and proceed to initialization at step 515. Initialization at step 515 means that the configuration field of the arbitration control register 211 has been written and the components and/or logic blocks of arbitration device 118 are made ready for operation according to the specified configuration. In addition, the power failure control feature is activated regardless of the configuration type and the failover control feature is activated for a master or slave configuration type. Operational details of the failover control feature are disclosed in the text accompanying FIG. 6. Operational details of the power failure control feature are disclosed in the text accompanying FIG. 7. Note that once the failover control feature and/or the power failure control feature are enabled, either feature can interrupt the normal processing of operational overview 500 steps at any time.

At step 530, the client state machine 230 of the arbitration device 118 identifies a next client that is requesting access to cache memory 120. Operational details of the client state machine 230 are disclosed in the text accompanying FIGS. 8–9. At step 538, the request of the identified client is forwarded to the cache memory interface 116 by the request state machine 235 and an acknowledgment of the request is returned to the arbitration device 118 by the cache memory interface 116. The cache memory interface 116 is also able to determine if a mirrored write operation is required and to communicate the need for remote memory access to the arbitration device 118. Operational details of the request state machine 235 are disclosed in the text accompanying FIGS. 10–11, and 15. At step 545, a grant signal is enabled by the grant state machine 240 for the requesting client that is now obtaining access to the cache memory 120 so that the requesting client can proceed to read/write to the cache memory 120. Operational details of the grant state machine 240 are disclosed in the text accompanying FIGS. 12–13. Processing continues to service client requests for access to cache memory 120 by returning to step 530.

Operationally, an internal client memory access request occurs when an internal client enables its request signal lead REQx to notify the arbitration device 118 of the request. The REQx signal lead stays enabled until the signaling client no longer wants access to the cache memory 120. When the arbitration device 118 determines that a given client can have its requested memory access, the arbitration device 118 enables the client's grant signal lead GNTx for the duration of time access is granted. If the internal client completes its read/write operations while the grant signal is enabled, then the request signal is disabled indicating to the arbitration device that the grant signal can also be disabled for the present client. Alternatively, if the transmitting client reaches its burst count limit prior to completing its read/write operation, then the arbitration device will disable its grant signal to the present client to terminate the client's transmission and the client's request signal remains enabled so the arbitration device 118 will once again grant the requested memory access at the client in due course. This interruption of client access to the cache memory 120 is referred to as pre-emption. In summary, an arbitration device 118 will pre-empt a client that has been granted access to cache memory 120 in either of the following two situations: 1) where the granted client's programmed maximum burst length, if any exists, has been reached and another client of equal or greater priority is presently requesting cache memory access; or 2) where a granted client's CNT value has fallen below the cache memory latency value and the cache memory's latency has elapsed prior to the granted client's CNT value reaching zero. Note that the latency value pre-emption will occur only if the CNT value has increased after falling below the cache memory latency value.

For an arbitration device 118 that is configured as the master in control of cache memory 120, internal client memory access requests are handled in the manner previously disclosed, and external client memory access requests, also known as slave requests, are arbitrated as stated below. A slave arbitration device communicates a memory access request to the master on behalf of one of the slave's internal clients, by the slave enabling its request memory signal lead REQ_MEM 291 for the duration of time the memory access is being requested. When the requested access is granted, the master enables the grant memory signal lead GNT_MEM 290 to notify the slave that memory access has been granted. However, just prior to granting memory access to the slave, the master enables its MEM_EXT signal lead 281 to notify its cache memory interface 116 that control of the cache memory 120 is being relinquished to an external device for a period of time. Similarly, just prior to relinquishing control of the cache memory 120, the slave arbitration device enables its MEM_EXT signal lead 281 to notify its cache memory interface 116 that control of the cache memory 120 is being relinquished to an external device, in this case the master, for a period of time.

Finally, there are two options for the type of external arbitration signal synchronization that can be used between a master arbitrator and a dependent slave arbitrator, including synchronous and asynchronous. The synchronization type is determined by the asynchronous external interface bit in the arbitration control register 211. The default synchronization type is asynchronous and is used when the propagation delay between the master and slave arbitrators is small. However, if the delay is more than about one half of a clock period, the synchronous option should be used by clearing the asynchronous external interface bit in the arbitration control register 211. Synchronous operations occur by using a master based synchronizer to align the incoming master arbitration signals to a clock in the master. The slave arbitration device clocks off the same clock as the master. Similarly, if an arbitration device configured as a slave is set for synchronous operation, incoming arbitration signals to the slave device are synchronized to the slave device clock.

FIG. 6 illustrates details of the operational steps 600 for the failover feature in flow diagram form. The failover feature is effective for the arbitration device 118 that is in either the master or the slave configuration. The purpose of the failover feature is to detect the failure of an external arbitrator and to take appropriate action to insure that the surviving arbitration device remains operational. The operational steps 600 begin at step 608 and represent the details of step 515 of FIG. 5.

At step 618, the arbitration device 118 begins monitoring all memory refresh operations. If it is determined at decision step 625 that the refresh operation of an external arbitrator completes successfully within a predetermined amount of time, then it is assumed that the external arbitrator is fully operational and monitoring continues in the background at step 618 as previously disclosed. Alternatively, if it is determined at decision step 625 that a memory refresh operation has not completed within a predetermined amount of time, then it is assumed that the external arbitrator has failed and processing continues at step 632.

If it is determined at decision step 632 that the failover bit in the arbitration control register 211 is not enabled, then processing continues to step 640. At step 640, the arbitration device 118 generates a refresh timeout error interrupt (REF_TIMEOUT_INT) 295 to notify any local host processor of the situation and processing continues at step 670 by returning to step 515 of FIG. 5. Alternatively, if it is determined at decision step 632 that the failover bit in the arbitration control register 211 is enabled, then processing continues at step 645 to disable the external arbitrator so that arbitration device 118 can continue operating normally.

At step 645, the arbitration device 118 changes the configuration type noted in the arbitration status register 213 from the present configuration to a single device configuration. At step 650, the memory refresh logic is enabled if it is not already enabled so that the lack of a refresh that precipitated the failover can be rectified. At step 657, the arbitration device 118 generates an external arbitration error interrupt EXT_ARB_INT 296 to notify the local host processor of the I/O controller 110 of the need to execute failover procedures. At step 665, the override signal lead OVERRIDE 294 is enabled to indicate to the external device to which signal lead 294 is attached that failover is occurring. The override signal lead 294 is the output from the arbitration device that is engaging the failover operation and the memory tri-state signal lead MEM_TRI 262 is the input to the external device being disabled due to the failover operation. The override signal is enabled to avoid contention over the cache memory 120 in the event the failed arbitrator should resume activity on the memory bus 121 once again in the future. At step 668 the arbitration status register 213 is updated to indicate that a failover has occurred and the failover feature is disabled to prevent any subsequent attempt to execute a failover until the entire master/slave configuration is reinitialized. Processing continues at step 670 by returning to step 515 in FIG. 5.

FIG. 7 illustrates details of the operational steps 700 in flow diagram form for the power failure suspend feature. The operational steps 700 begin at step 708 and represent the details of step 515 in FIG. 5. If it is determined at decision step 715 that the suspend feature of arbitration device 118 is not enabled, then processing continues at step 750 by returning to step 515 of FIG. 5. Alternatively, if it is determined at decision step 715 that the suspend feature of arbitration device 118 is not enabled, then processing continues at step 721.

If it is determined at decision step 721 that no suspend signal exists on SUSPEND signal lead 260 of the arbitration device 118, then the suspend feature remains idle. Alternatively, if it is determined at decision step 721 that a suspend signal exists on SUSPEND signal lead 260, then processing continues at step 727. Determining if a loss of power is imminent and sending a suspend signal on SUSPEND signal lead 260 to notify the arbitration device 118, is the function of a board level or other host level type device.

At step 727, the arbitration device 118 begins the power down process by servicing any client requests that existed at the time the suspend signal was received. If it is determined at decision step 735 that a sufficient predetermined amount of time has not elapsed since the last request for memory access was received, then processing continues to service requests for memory access at step 727 as previously disclosed. Alternatively, if it is determined at decision step 735 that a predetermined length of time has elapsed since the last request for memory access was received, then processing continues to step 744.

At step 744, the arbitration device 118 signals the cache memory interface 116 to put the cache memory 120 in power down mode by enabling a signal on the suspend ready signal lead SUSP_RDY 263. The SUSP_RDY signal 263 also alerts the I/O bus interfaces 114–115 not to accept any more incoming commands for processing by the I/O bus bridge 110. The suspend state remains in effect until a reset signal is received by the arbitration device 118 on the reset signal lead RESET 261. Thus, if it is determined at decision step 748 that no reset signal is received on RESET signal lead 261, then the arbitration device 118 remains idle. Alternatively, if it is determined at decision step 748 that a reset signal is received on RESET signal lead 261, then processing continues at step 750 by returning to step 515 of FIG. 5.

Figure 8:
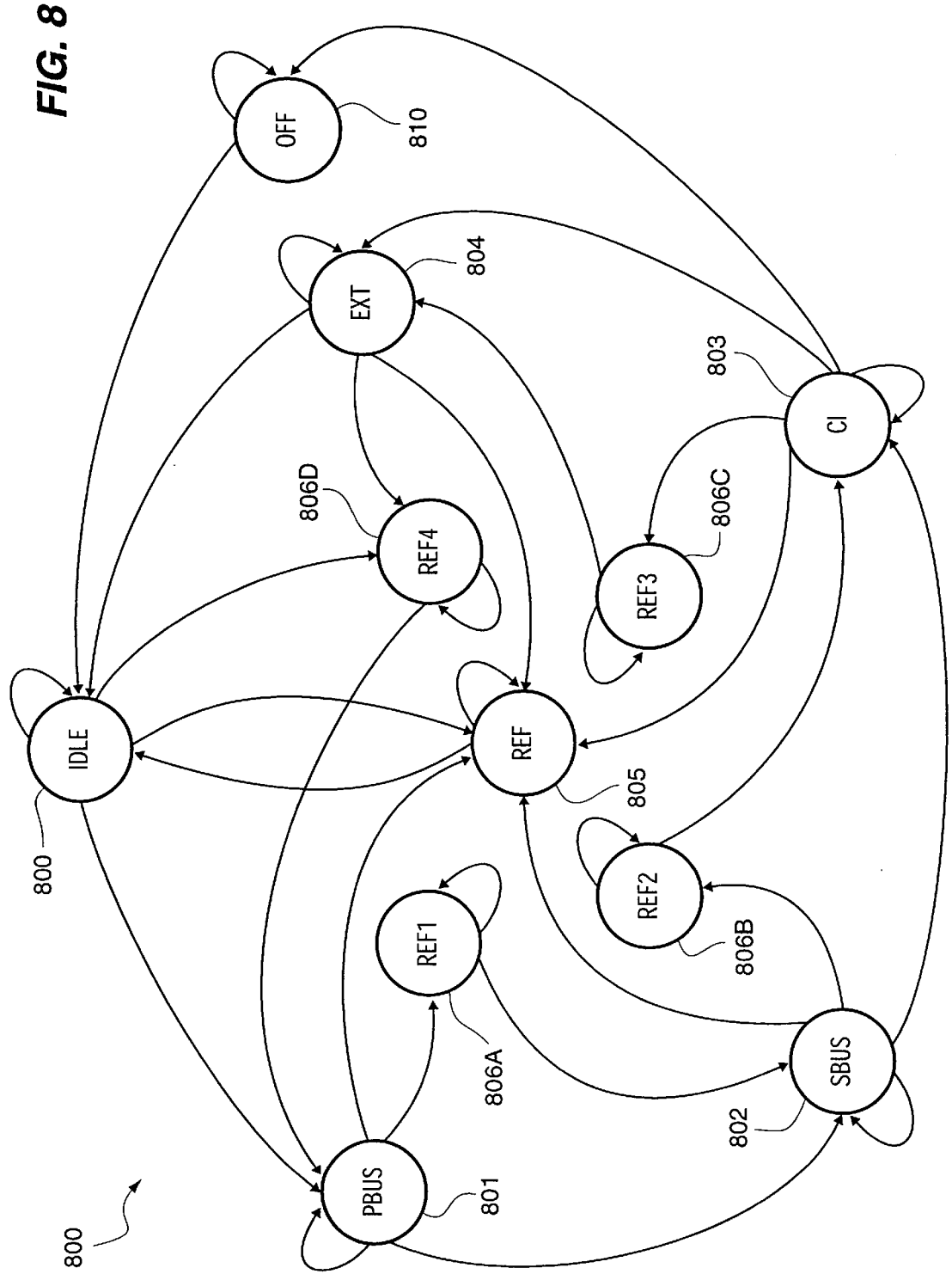
FIG. 8 illustrates an overview of the client state machine logic in state diagram form.
Figure 9A:
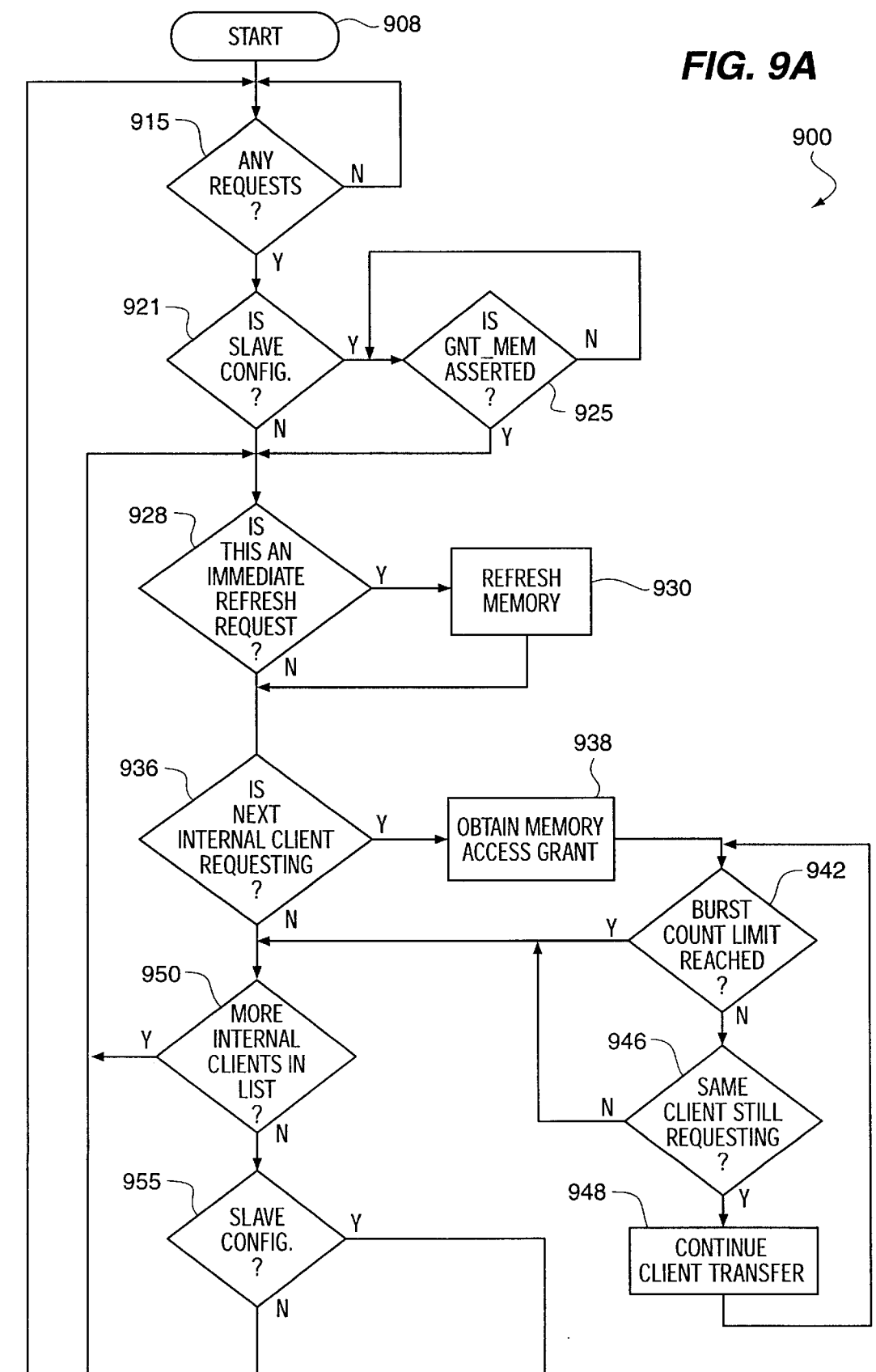
FIGS. 9A and 9B illustrate a generalization of the client state machine logic operational steps in flow diagram form.
Figure 9B:
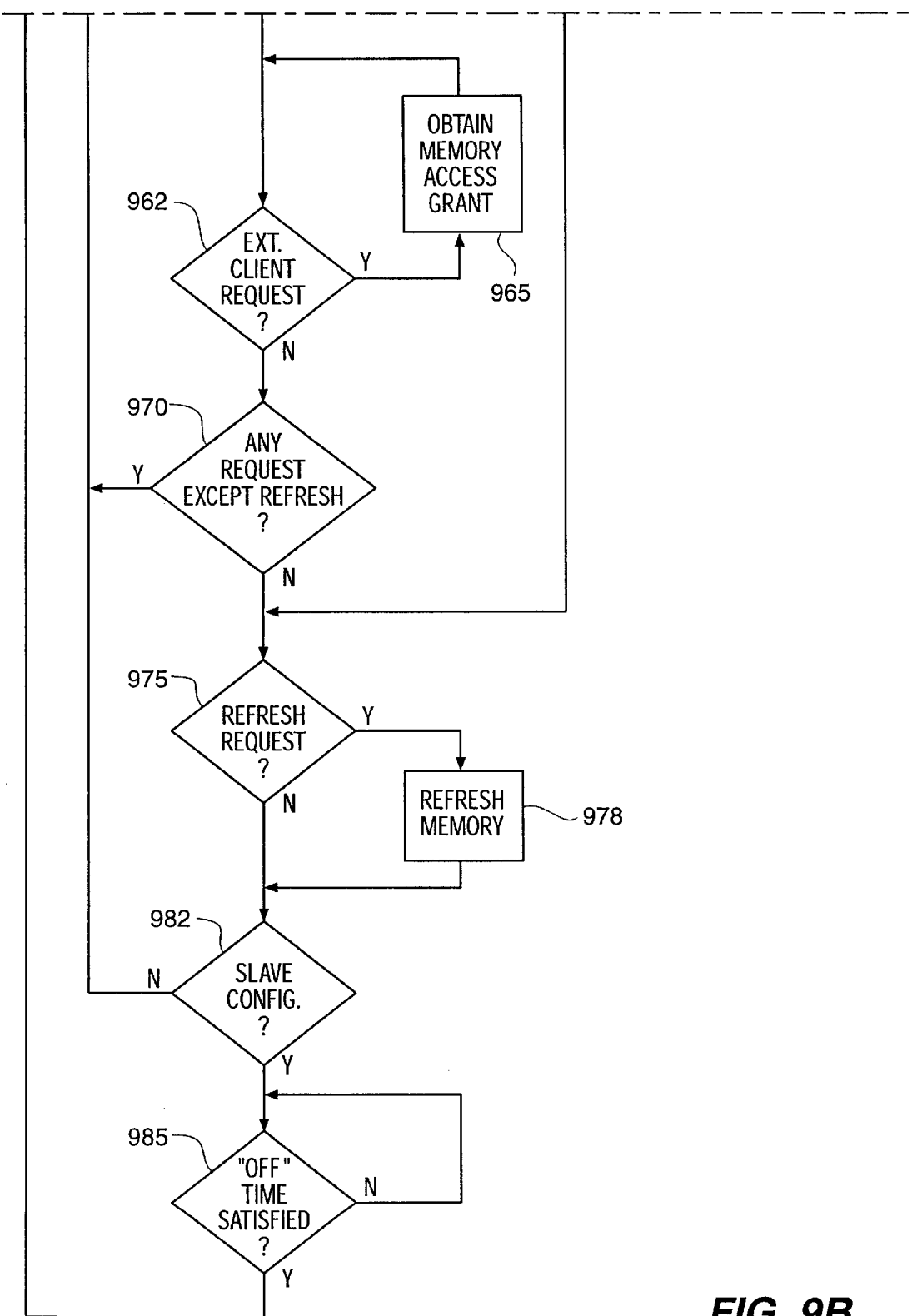

Client State Machine Operational Steps—FIGS. 8–9

FIG. 8 illustrates operational details of the client state machine 230 in the form of a client state diagram 800. The client state diagram 800 can be expanded to include any number of clients, however, the present illustration includes one external client (EXT) 804, and internal clients that include, a primary bus interface client (PBI) 801, secondary bus interface client (SBI) 802, command interpreter client (CI) 803, a normal refresh client (REF) 805, and an immediate refresh client (REFI) represented by the collective states 806a–806d. The collective states 806a–806d are in fact one logical "state" that is illustrated as four actual states for coherent state diagraming purposes only. Additional non-client states in state diagram 800 include an off state 810 and an idle state 811.

Operationally, client state diagram 800 operates under the general principle that the next client to receive memory access consideration depends on which client is presently being served. That is, from any point in the state diagram 800 there exists at least one directed arrow indicating the state or states that could be next client to receive access to cache memory 120. Where more than one directed arrow exists from a given state, the next client to be served is typically determined by the level of priority that exists for a given client. For example, a state change takes place from one client to the next among the several clients 801–804 before returning to the idle state 811.

Refresh operations can alter the order of which state is next within the client state diagram 800. For example, the normal refresh client 805 is the lowest priority client so that if after all other clients 801–804 that are requesting cache memory 120 access have had their turn, the normal refresh client 805 is granted access. When the normal refresh client 805 is finished with its refresh operation, then the idle state 811 is the next state. Alternatively, the immediate refresh client 806a–806d is the highest priority client so that if an immediate refresh is required during the time the present state is any one of the states 811 or 801–804, an appropriate one of the immediate refresh states 806a–806d preempts any other state 811 or 801–804 as the next state. For example if an immediate refresh is requested at the time the secondary I/O bus client state 802 has access to cache memory 120, immediate refresh state 806b preempts the command interpreter client state 803 as the next client to receive access to cache memory 120. When immediate refresh state 806b has completed its refresh operation, then the command interpreter client state 803 is the next state.

The idle state 811 is where the state machine 800 idles until a client request occurs. Cycling through the client states 801–804 allows the state machine 800 to identify which of the clients 801–804 is making the request and initiate the servicing of the request. Note that the EXT client state 804 only exists for an arbitration device configured as a master because the master must give an external slave device an opportunity to have access the cache memory 120 just as the master must give its own internal clients a turn at accessing the cache memory 120. The off state 810 exists only for an arbitration device that is configured as a slave because there must be a minimum sized gap in time between consecutive request signals from a slave arbitration device to its master. For example, once in the off state 810 the slave disables its request signal on the REQ_MEM signal lead 291 for a time that is at least equal to a predetermined minimum pulse width. The predetermined minimum pulse width is a gap in the slave's request signal that is certain to be recognized by the master so as to cause the master to respond by disabling its grant signal on the GNT_MEM signal lead 290.

FIG. 9 illustrates a generalization of the client state diagram 800 in terms of a set of operational steps 900 in flow diagram form. As with the text accompanying FIG. 8, the general principle behind the operational steps 900 is that clients are addressed in a priority basis with immediate refresh requests intermixed at the highest priority and normal refresh requests intermixed when no other clients are making requests.

The operational steps 900 begin at step 908 and proceed to step 915. If it is determined at decision step 915 that there are no requests pending for any client, then processing idles at step 915. Alternatively, if it is determined at decision step 915 that there is a pending request from a client, then processing continues at step 921. If it is determined at decision step 921 that the arbitration device 118 is a slave configuration, then processing continues at step 925 to determine if the master arbitration device has granted cache memory 120 access to the slave. Alternatively, if it is determined at decision step 921 that the arbitration device 118 is not a slave configuration, then processing continues at step 928. If it is determined at decision step 925 that the master has the GNT_MEM signal lead 290 disabled, then processing idles at step 925 to wait for the signal to be enabled. Alternatively, if or when it is determined at decision step 925 that the GNT_MEM signal lead 290 is enabled, then processing continues to step 928.

If it is determined at decision step 928 that an immediate refresh is being requested, then processing continues at step 930 where memory is promptly refreshed prior to processing continuing at step 936. Alternatively, if it is determined at decision step 928 that an immediate refresh is not being requested, then processing continues at step 936

If it is determined at decision step 936 that the next client that is not a refresh client is requesting cache memory 120 access, processing continues at step 938 where the request state machine 235 and grant state machine 240 operate cooperatively to obtain a grant of access to cache memory 120 on behalf of the requesting client. Details of the request state machine 235 are disclosed in the text accompanying FIGS. 10–11. Details of the grant state machine 240 are disclosed in the text accompanying FIGS. 12–13. Once cache memory 120 access is obtained at step 938, the present client can begin transferring data at steps 942 and 946.

If it is determined at decision step 942 that the burst count limit has not been reached for the present client transfer, then processing continues at step 946. If it is determined at decision step 946 that the present client is still requesting access to the cache memory 120, then the client data transfer continues at step 948 in conjunction with the decision steps 942 and 946. If at any time during the client data transfer the burst count limit of the data transfer is reached at decision step 942, or it is determined that the present client is no longer requesting cache memory 120 access at decision step 946, then the client data transfer stops and processing continues at step 950.

If it is determined at decision step 950 that there are more internal clients available to process for potential access to cache memory 120, then processing continues at step 928 as previously disclosed. Alternatively, if it is determined at decision step 950 that there are no additional internal clients to process at this time, then processing continues at step 955.

If it is determined at decision step 955 that the arbitration device 118 is configured as a slave device, then processing continues at step 975. Alternatively, if it is determined at decision step 955 that the arbitration device 118 is not configured as a slave device, then processing continues at step 962. If it is determined at decision step 362 that an external client is requesting cache memory 120 access, then processing continues to step 965 where cache memory 120 access is obtained for the external client for the length of time the external client maintains the request. Alternatively, if or when it is determined at decision step 962 that no external client request for cache memory 120 access exists, then processing continues at step 970.

If it is determined at decision step 970 that there are additional non-refresh client requests pending, then processing continues at step 928 as previously disclosed. Alternatively, if it is determined at decision step 970 that there are no additional non-refresh client requests pending, then processing continues at step 975. If it is determined at decision step 975 that there is a refresh request pending for either a normal refresh or an immediate refresh, then processing continues at step 978 to refresh memory as requested. Alternatively, if it is determined at decision step 975 that there is no refresh request pending, then processing continues at step 982.

If it is determined at decision step 982 that the present arbitration device 118 configuration is not a slave configuration, the processing continues at step 928 as previously disclosed. Alternatively, if it is determined at decision step 982 that the present arbitration device 118 configuration is a slave configuration, then processing continues at step 985 where the arbitration device 118 enters an off state. If it is determined at decision step 985 that the slave arbitration device 118 has not disabled its REQ_MEM 291 signal for a predetermined minimum pulse width period sufficient to cause the master to also disable its GNT_MEM 290 signal, then the slave device remains in the off state at step 985. Alternatively, if it is determined at decision step 985 that the slave arbitration device 118 has disabled its REQ_MEM 291 signal for a predetermined period sufficient to cause the master to also disable its GNT_MEM 290 signal, then processing continues at step 915 as previously disclosed.

Figure 10:
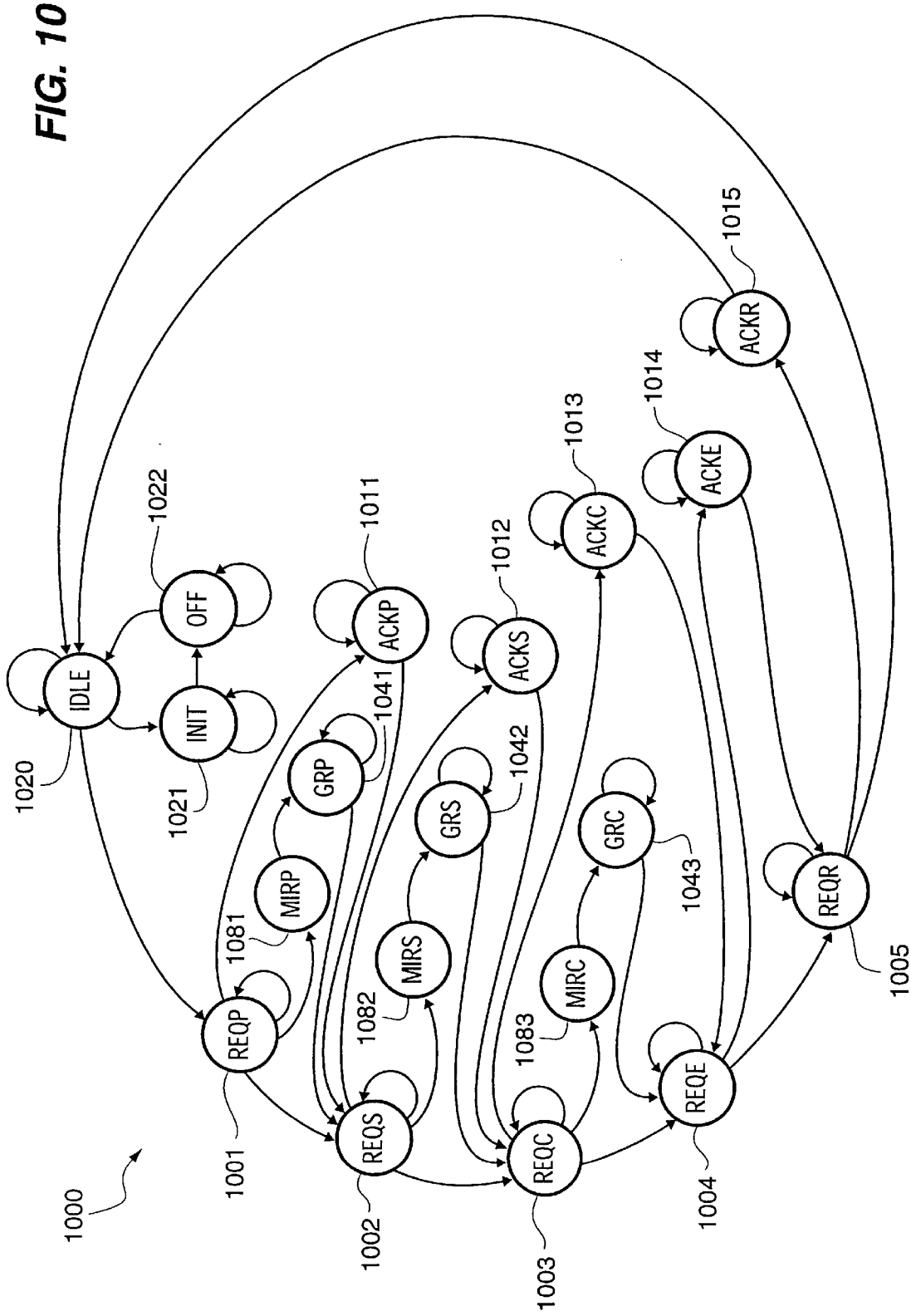
FIG. 10 illustrates an overview of the request state machine logic in state diagram form.
Figure 11:
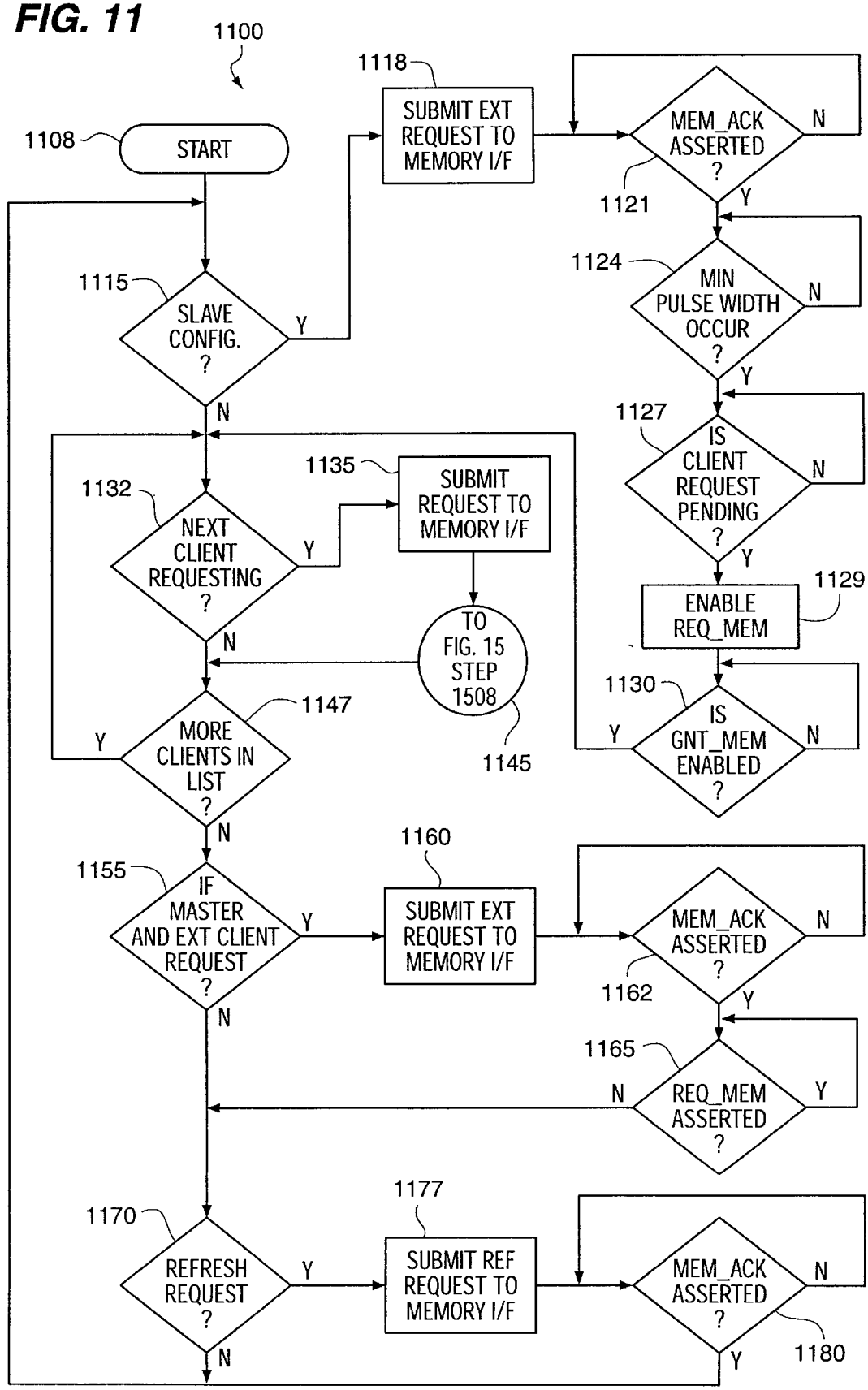
FIG. 11 illustrates a generalization of the request state machine logic operational steps in flow diagram form.
Figure 15:
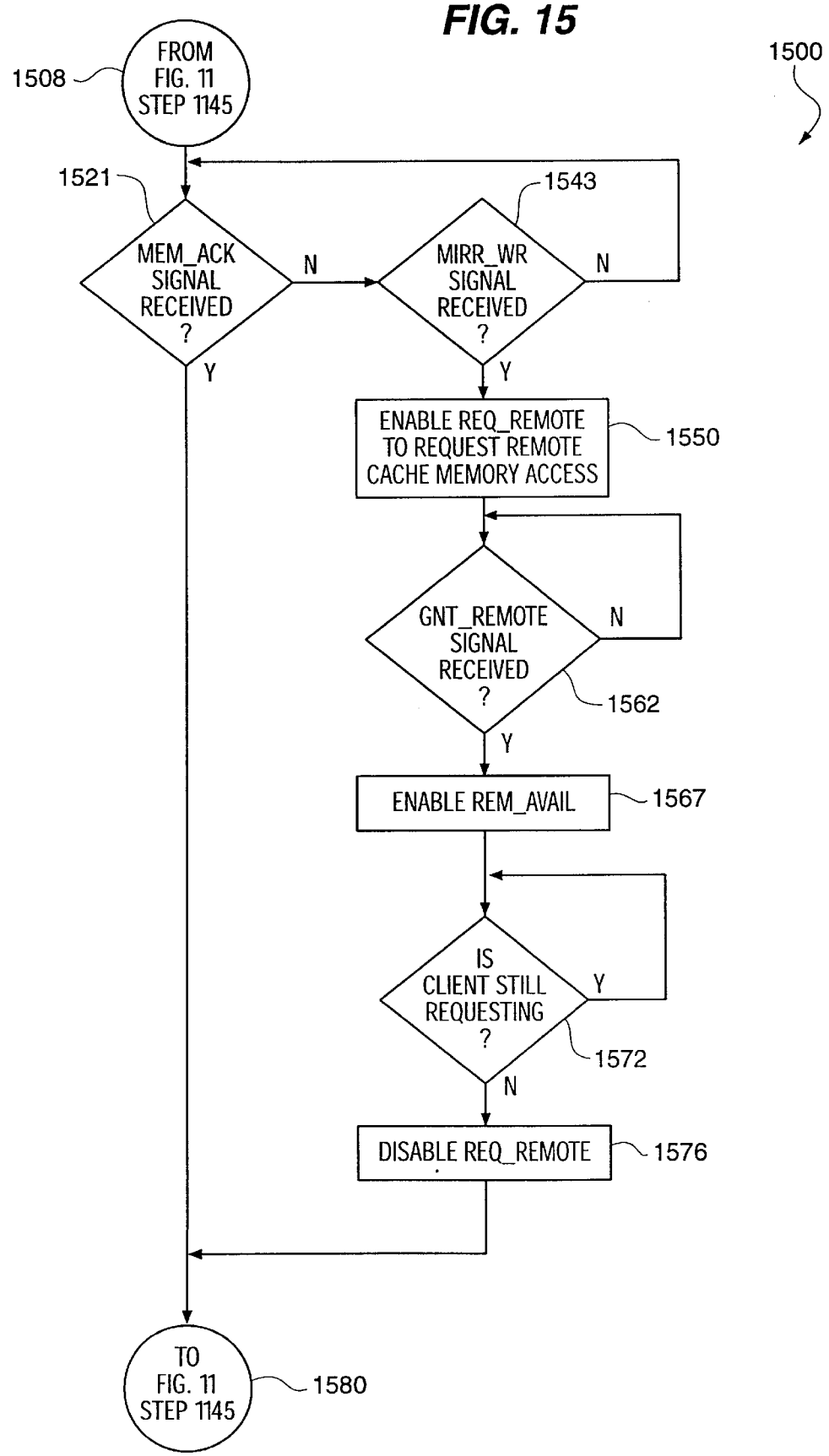
FIG. 15 illustrates details of the mirrored write request state machine operational steps in flow diagram form.

Request State Machine Operational Steps—FIGS. 10–11 & 15

FIG. 10 illustrates operational details of the request state machine 235 in the form of a request state diagram 1000. The request state machine 235 idles at the idle state 1020 until notified that a request is pending for a given client by way of the client state machine 230. After the transition from the idle state 1020, each of a set of client states 1001–1005 is visited in turn to submit a cache memory 120 access request to the cache memory interface 116 on behalf of a given client. The request state machine 235 knows of a pending request because the client state machine 230 communicates this information at various points in the client state machine operational steps 900 that include, but are not limited to, steps 930, 938, 965, and 978 for example. If a request for the local cache memory 120 is pending for a given one of the clients 1001–1005, then the request state machine 235 communicates the request to the cache memory interface 116.

If the cache memory interface 116 determines that the request requires access to local cache memory 120 only, then the request state machine 235 transitions to the respective acknowledgment states 1011–1015 where the cache memory interface 116 sends an acknowledgment on the MEM_ACK signal lead 284 to the request state machine 235 to acknowledge receipt of the request for access to local cache memory 120. From the respective acknowledgment states 1011–1015, the request state machine 235 transitions to the next one of the client states 1001–1005. However, from either the last state 1005 or the acknowledgment 1015 for a request from the last state 1005, processing returns to the idle state 1020. Note that the REQE state 1004 and ACKE state 1014 for an external device request and acknowledgment only exist for an arbitration device 118 configured as a master.

If the cache memory interface 116 determines that a memory access request from one of the clients 1001–1005 requires access to a remote cache memory for a mirrored write operation on behalf of one of the local internal clients 1001–1003, then the cache memory interface 116 sends a signal to the request state machine 235 on the MIRR_WR signal lead 286 to acknowledge the request for access to the local cache memory 120 and to prompt the request state machine 235 to forward a request for access to the necessary remote cache memory on the REQ_REMOTE signal lead 292. When the request state machine 235 receives a return signal on the GNT_REMOTE signal lead 293 indicating availability of the remote cache memory, the request state machine 235 signals the availability of the remote cache memory to its cache memory interface 116 with a signal on the REMOTE_AVAIL signal lead 287. From the respective one of the remote grant states 1041–1043, the request state machine 235 transitions to the next one of the client states 1002–1004 or the idle state 1020 which ever is next.

If it is determined that the arbitration device 118 is configured as a slave then the request state machine 235 transitions to the initialization state 1021. Once in the initialization state 1021, an external client request signal is sent on the MEM_EXT signal lead 281 to the cache memory interface 116 to indicate that the slave is ready to release cache memory interface 116. Once an acknowledgment to the MEM_EXT signal is received back from the cache memory interface 116 on the MEM-ACK signal lead 284, the request state machine 235 transitions to the off state 1022. The off state 1022 exists only for an arbitration device that is configured as a slave because there must be a minimum sized gap in time between consecutive request signals from a slave arbitration device to its master. Once in the off state 1022, the slave disables its request signal on the REQ_MEM signal lead 291 for a time that is at least equal to a predetermined minimum pulse width. The predetermined minimum pulse width is a gap in the slave's request signal that is certain to be recognized by the master so as to cause the master to respond by disabling its grant signal on the GNT_MEM signal lead 290. Once the predetermined minimum pulse width period is expired, then the request state machine 235 transitions to the idle state 1020 for subsequent processing as previously disclosed.

FIG. 11 illustrates a generalization of the request state diagram 1000 in terms of a set of operational steps 1100 in flow diagram form. Operational steps 1100 begin at step 1108 and proceeds to decision step 1115. If it is determined at decision step 1115 that the arbitration device 118 is configured as a slave device, then processing continues at step 1118. Alternatively, if it is determined at decision step 1115 that the present configuration of the arbitration device 118 is not a slave device, then processing continues at step 1132.

Step 1118 is the first of steps 1118–1124 that are executed by the slave arbitration device 118 to make certain that it has relinquished control of the memory bus 121. At step 1118, a cache memory 120 access request is submitted on the MEM_EXT signal lead 281 by the slave arbitration device 118 to the cache memory interface 116. If it is determined at decision step 1121 that an acknowledgment has not yet been received from the cache memory interface 116 for the immediate cache memory 120 access request, then processing continues to wait at step 1121. Alternatively, if or when it is determined at decision step 1121 that an acknowledgment has been received for the immediate cache memory 120 access request, then processing continues at step 1124. If it is determined at decision step 1124 that the REQ_MEM signal lead 291 of the slave arbitration device 118 has not been disabled for at least a minimum pulse width length of time, then processing waits at step 1124. Alternatively, if or when it is determined at decision step 1124 that a minimum pulse width has occurred on the REQ_MEM signal lead 291, then processing continues at step 1127.

If it is determined at decision step 1127 that there is no client request for access to cache memory 120 that needs forwarding to the cache memory interface 116, then processing idles at step 1127. Alternatively, if it is determined at decision step 1127 that a client request for access to cache memory 120 is pending, then processing continues at step 1129. At step 1129, the REQ_MEM signal lead 291 is enabled to forward a request for access to cache memory 120. If it is determined at decision step 1130 that the GNT_MEM signal lead 290 has not been enabled to indicate that access to cache memory 120 has been granted, then processing idles at step 1130. Alternatively, if it is determined at decision step 1130 that the GNT_MEM signal lead 290 has been enabled, then processing continues at step 1132.

If it is determined at decision step 1132 that the next internal client in the set of internal clients is requesting access to cache memory 120 by having a request signal enabled on a REQ signal lead such as 274 or 277, then processing continues at step 1135. At step 1135 a cache memory 120 access request is submitted on an appropriate one of the internal client request signal leads 282–283 to the cache memory interface 116 on behalf of the requesting client, and processing continues at step 1147 by way of step 1145. Details of step 1145 are disclosed in the text accompanying FIG. 15. Note that although concurrent requests may exist on the REQ signal leads 274 through 277 for example, only one request is forwarded at a time to cache memory interface 116 on one of the internal client IC_REQ signal leads 282–283 to cache memory interface 116.

If it is determined at decision step 1147 that there are additional internal clients that have requests for cache memory 120 access pending, then processing continues at step 1132 as previously disclosed. Alternatively, if it is determined at decision step 1147 that there are not additional internal client having requests for cache memory 120 access pending, then processing continues at step 1155.

If it is determined at decision step 1155 that the present arbitration device 118 configuration is a master configuration and that there is an external device requesting access to cache memory 120, then processing continues at step 1160. Alternatively, if it is determined at decision step 1155 that the present arbitration device 118 configuration is not a master configuration or there is no external device of client requesting access to cache memory 120, then processing continues at step 1170. At step 1160 a request for cache memory 120 access is submitted by the request state machine 235 on the MEM_EXT signal lead 281 to the cache memory interface 116 on behalf of the external client. If it is determined at decision step 1162 that an acknowledgment to the request has not been received by the request state machine 235 on the MEM_ACK signal lead 284, then the request state machine 235 waits for an acknowledgment. Alternatively, if or when it is determined at decision step 1162 that an acknowledgment to the request has been received by the request state machine 235 on the MEM-ACK signal lead 284, then processing continues at step 1165. If it is determined at decision step 1165 that the REQ_MEM signal lead 291 is enabled, then the cache memory interface request signal on the MEM_EXT signal lead 281 remains enabled because the external client is not finished accessing cache memory 120. Only when it is determined at decision step 1165 that the REQ_MEM signal lead 291 is disabled, does the arbitration device 118 know that the MEM_EXT signal lead 281 can be disabled so that a new request can be made on behalf of the next client requesting access to cache memory 120. Processing continues at step 1170.

If it is determined at decision step 1170 that a refresh request is pending, then processing continues at step 1177 where the refresh request is submitted to the cache memory interface 116 by a refresh request signal on the FWD_REQ_REF signal lead 280. If it is determined at decision step 1180 that an acknowledgment to the refresh request has not been received by the request state machine 235 on the MEM-ACK signal lead 284, then the request state machine 235 waits for an acknowledgment. Alternatively, if or when it is determined at decision step 1180 that an acknowledgment to the refresh request has been received by the request state machine 235 on the MEM-ACK signal lead 284, then processing continues at step 1115 as previously disclosed. Similarly, if it is determined at decision step 1170 that a refresh request is not pending, then processing continues at step 1115 as previously disclosed.

FIG. 15 illustrates the operational steps 1500 that are the details of step 1145 in FIG. 11. Operational steps 1500 begin at step 1508 and proceed directly to step 1521. If it is determined at decision step 1521 that an acknowledgment to the request for access to the local cache memory 120 has not been received by the request state machine 235 on the MEM_ACK signal lead 284, then the request state machine 235 continues at step 1543. Alternatively, if or when it is determined at decision step 1521 that an acknowledgment to the request for access to the local cache memory 120 has been received by the request state machine 235 on the MEM_ACK signal lead 284, then processing continues at step 1147 and the cache memory 120 access will be for the local cache memory 120 only. Processing then continues at step 1580 by returning to step 1145 of FIG. 11.

If it is determined at decision step 1543 that an acknowledgment to the request for memory access has not been received by the request state machine 235 on the MIRR_WR signal lead 286, then the request state machine 235 continues at step 1521 to wait for a signal on either the MEM_ACK signal lead 284 or the MIRR_WR signal lead 286. Alternatively, if or when it is determined at decision step 1543 that an acknowledgment to the request for a memory access has been received by the request state machine 235 on the MIRR_WR signal lead 286, then the request for access to the local cache memory is considered acknowledged and processing continues at step 1550. At step 1550 the request state machine 235 sends a request to its accompanying mirrored write arbitrator for access to the attached remote cache memory by way of a signal on the REQ_REMOTE signal lead 292. Processing continues at step 1562. Access to the remote cache memory is necessary so that a mirrored write operation can be executed.

If it is determined at decision step 1562 that an acknowledgment to the remote memory request has not been received by the request state machine 235 on the GNT_REMOTE signal lead 293, then processing continues at step 1562 to wait for a signal on the GNT_REMOTE signal lead 293. Alternatively, if it is determined at decision step 1562 than an acknowledgment to the remote memory request has been received by the request state machine 235 on the GNT_REMOTE signal lead 293, then the mirrored write is ready to take place and processing continues at step 1567.

At step 1567 the REMOTE_AVAIL signal lead 287 is enabled to inform the cache memory interface 116 that all requests for memory access have been granted and the mirrored write operation can proceed. If it is determined at decision step 1572 that one of the client REQ signal leads 280–283 is still enabled indicating that a client is still requesting access to cache memory 120, then processing continues to wait at step 1572. Alternatively, if it is determined at decision step 1572 that no client requests are pending, then processing continues at step 1576. At step 1571, the REQ_REMOTE signal lead 292 is disabled to signal the external mirrored write arbitrator to disable its GNT_REMOTE signal lead 293 in response. Processing continues at step 1580 by returning to step 1145 of FIG. 11.

Figure 12:
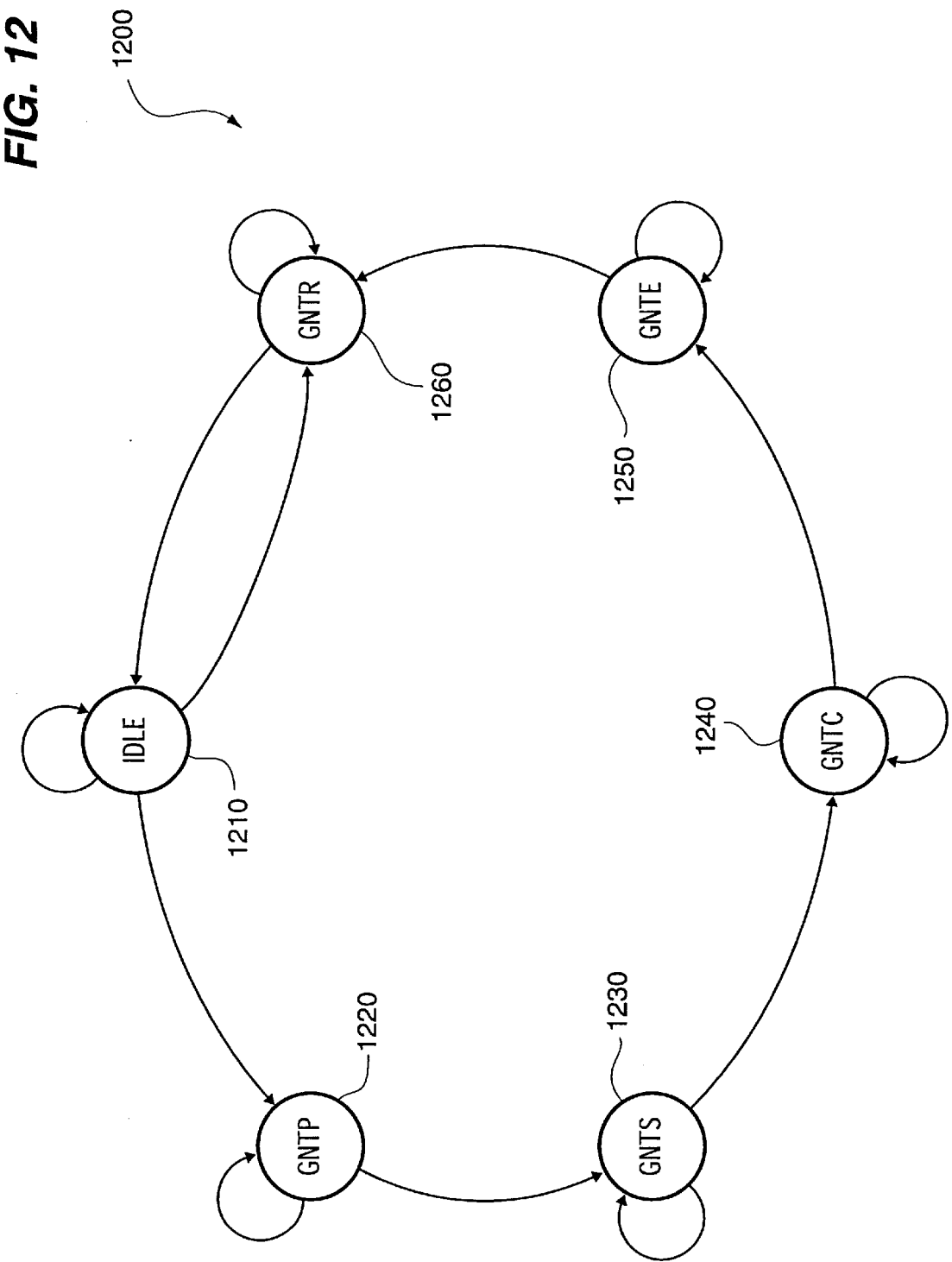
FIG. 12 illustrates an overview of the grant state machine logic in state diagram form.
Figure 13:
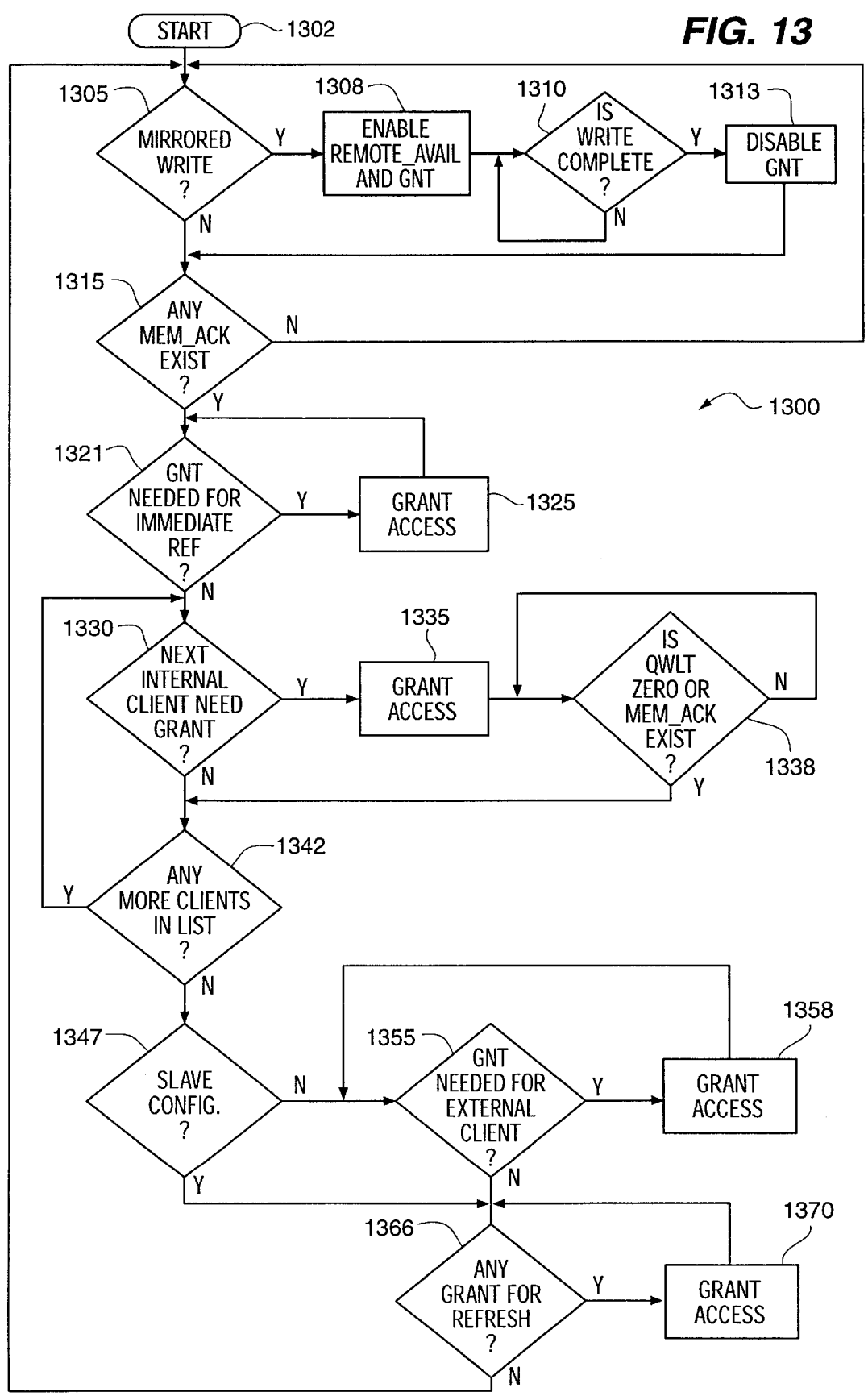
FIG. 13 illustrates a generalization of the grant state machine logic operational steps in flow diagram form.

Grant State Machine Operational Steps—FIGS. 12–13

FIG. 12 illustrates operational details of the grant state machine 240 in the form of a grant state diagram 1200. It is important to note that the grant state machine 240 operates on behalf of ordinary local cache memory writes as well as mirrored write operations. The grant state machine 240 operates by idling at the idle state 1210 until either the MEM_ACK signal lead 284 or the GNT_REMOTE signal lead 293 is enabled. A signal on either the MEM-ACK signal lead 284 or the GNT_REMOTE signal lead 293 indicates to the grant state machine 240 of the arbitration device 118 that access to an appropriate cache memory is available for a write operation.

For an ordinary local cache memory write operation, once the MEM ACK signal lead 284 is enabled, the grant state machine 240 transitions from the idle state 1210 to each of the client states 1220–1260 in turn to grant successive clients access to the local cache memory 120 by enabling the appropriate GNT signal lead 275–278. Each requesting client 1220–1240 is granted access to cache memory 120 so long as the Quad Words Left to Transfer (QWLT) is not zero and no new signal exists on either the MEM_ACK signal lead 284 or the GNT_REMOTE signal lead 293. Note that the external client state GNTE 1250 is only visited by an arbitration device 118 configured as a master, and the refresh client state GNTR 1260 is only granted access to cache memory 120 if a request for refresh access exists.

For a remote mirrored write operation, once the GNT_REMOTE signal lead 193 is enabled, the grant state machine 240 enables the REMOTE_AVAIL signal lead 287 and an appropriate one of the GNT signal leads 275–278 to indicate that the requested remote mirrored write operation can proceed. The REMOTE_AVAIL signal lead 287 is detected by the cache memory interface 116 and the appropriate one of the GNT signal leads 275–278 is detected by a client 270–271. At the completion of the remote mirrored write operation all enabled leads are disabled and the grant state machine idles again at state 1210. Thus the transition of states for a remote mirrored write is essentially from the idle state 1210 to the requesting one of the client states 1220–1240, and then back again to the idle state 1210.

FIG. 13 illustrates a generalization of the grant state diagram 1200 in terms of a set of operational steps 1300 in flow diagram form. Operational steps 1300 begin at step 1302 and proceed to step 1305. If it is determined at decision step 1305 that the pending memory access request is not for a remote mirrored write operation, then processing continues at step 1315. Alternatively, if it is determined at decision step 1305 that the pending memory access request is for a remote mirrored write operation, then processing continues at step 1308.

At step 1308, the REMOTE_AVAIL signal lead 287 and an appropriate one of the GNT signal leads 275–278 are enabled by the grant state machine 240 once the grant state machine detects that the GNT_REMOTE signal lead 293 is enabled. The GNT_REMOTE signal lead 293 is enabled by the external mirrored write master to indicate the availability of the remote cache memory required for the mirrored write operation. The REMOTE_AVAIL signal lead 287 carries a short burst signal to the cache memory interface 116 by briefly enabling and then disabling the signal lead.

If it is determined at decision step 1310 that the remote mirrored write operation is not complete, then processing continues waiting at step 1310. Alternatively, if it is determined at decision step 1310 that the remote mirrored write operation is complete, then processing continues at step 1313. The client requesting the remote mirrored write operation is granted exclusive access to both the local and remote cache memories so long as the QWLT is not zero and no new write requests exist. At step 1313 the appropriate one of the GNT signal leads 275–278 is disabled to indicate to the client that access to the necessary cache memories is no longer available. Processing continues at step 1315.

If the grant state machine 240 determines at decision step 1315 that the MEM_ACK signal lead 284 is not enabled, then the local cache memory 120 is not available or no client requests for access are pending, so that processing continues to wait at step 1305. Alternatively, if or when it is determined at decision step 1315 that the MEM_ACK signal lead 284 is enabled, then processing continues at step 1321.

If it is determined at decision step 1321 that a grant of access to cache memory 120 is required for an immediate refresh, then processing continues to step 1325 where access is granted for the length of time access is required. Alternatively, if it is determined at decision step 1321 that a grant of access to cache memory 120 is not required for an immediate refresh, then processing continues at step 1330.

If it is determined at decision step 1330 that the next internal client in the set of internal clients has requested and is ready for a grant of access to cache memory 120, then processing continues at step 1335 where the access is granted by enabling the appropriate one of the internal client GNT signal leads such as 275–278. If it is determined at decision step 1338 that the QWLT is not zero and that neither the MEM_ACK signal lead 284 or the GNT_REMOTE signal leads 293 are enabled, then the grant of client access to cache memory 120 continues. Alternatively, if it is determined at decision step 1338 that either the QWLT for the present client is zero or either the MEM_ACK signal lead 284 or the GNT_REMOTE signal lead 293 is enabled, then processing continues at step 1342. If it is determined at decision step 1342 that there are additional internal clients in the set of internal clients that require a grant of access to cache memory 120, then processing continues at step 1330 as previously disclosed. Alternatively, if it is determined at decision step 1342 that there are no additional internal clients in the set of internal clients that require a grant of access to cache memory 120, then processing continues at step 1347.

If it is determined at decision step 1347 that the arbitration device 118 is configured as a slave, then processing continues at step 1366. Alternatively, if it is determined at decision step 1347 that the present arbitration device 118 is configured as a master or a single device, but not a slave, then processing continues at step 1355. If it is determined at decision step 1355 that an external client requires a grant of access to cache memory 120, then processing continues at step 1358 where access is granted to the external client until the external client disables the REQ_MEM signal lead 291 for at least a minimum pulse width. When a minimum pulse width is detected on the REQ_MEM signal lead 291, the master disables the GNT_MEM signal lead 290 to terminate access to cache memory 120. Alternatively, if it is determined at decision step 1355 that no external client requires a grant of access to cache memory 120, then processing continues at step 1366.

If it is determined at decision step 1366 that a normal or immediate refresh request is pending, then processing continues at step 1370 where the refresh client is granted access to cache memory 120 for the length of time required to complete the refresh operation. The grant of access to cache memory 120 is communicated to the refresh logic 113 by enabling the GNT_REF signal lead 253. Alternatively, if it is determined at decision step 1366 that a grant of cache memory 120 access is not required, then processing continues at step 1305 as previously disclosed.

Summary

A multiple client memory arbitration system that supports mirrored write operations between a local cache memory arbitrated by a local arbitration device and a remote cache memory arbitrated by a remote arbitration device, in addition to active/active failover between said local arbitration device and said remote arbitration device. Although specific embodiments are disclosed herein, it is expected that persons skilled in the art can and will make, use, and/or sell alternative enhanced dual port I/O bus bridges that are within the scope of the following claims either literally or under the Doctrine of Equivalents.

What is claimed is:

1. A multiple client memory arbitration system having a plurality of internal clients of a cache memory and at least one external client of said cache memory, said system comprising:

a first arbitrator of a local cache memory in an I/O controller device;

a second arbitrator of a remote cache memory in a remote device;

means for arbitrating access to said local cache memory among said plurality of internal clients and said at least one external client by said first arbitrator, wherein said means of arbitrating further comprises:

means for selecting a configuration type selected from a group of configuration types consisting of: unknown device configuration, single device configuration, multiple device master configuration, multiple device slave configuration, wherein said arbitration system is capable of operating said unknown device configuration, single device configuration, multiple device master configuration, and multiple device slave configuration;

means for requesting access to said remote cache memory from said second arbitrator; and means for executing a mirrored write to said local cache memory and said remote cache memory substantially concurrently by direction of said first arbitrator.

2. A system according to claim 1 wherein said means for arbitrating further comprises:

means for configuring said arbitrator of said cache memory based on said configuration type;

means for refreshing said local cache memory at any time independent of said configuration type;

means for executing a first failover control type of said local cache memory among a plurality of arbitration devices in a multiple arbitration device configuration having at least a first local arbitration device and a second local arbitration device; and means for executing a second failover control type of operational duties as between said local arbitration device and said remote arbitration device.

3. A system according to claim 1 wherein said means for executing includes:

means for executing write back caching with said mirrored write to said local cache memory and said remote cache memory substantially concurrently by direction of said first arbitrator.

4. A system according to claim 2 wherein said means for executing the second failover includes:

means for identifying a failed one of said first arbitration device and said second arbitration device;

means for disabling a failed one of said first arbitration device and said second arbitration device; and means for continuing an uninterrupted operational state of a surviving one of said first arbitration device and said second arbitration device as a single arbitration device having a single device arbitration configuration.

5. A system according to claim 2 wherein said means for executing the first failover includes:

means for identifying a failed one of said first arbitration device and said second arbitration device;

means for disabling a failed one of said first arbitration device and said second arbitration device; and means for continuing an uninterrupted operational state of a surviving one of said first arbitration device and said second arbitration device as a single arbitration device having a single device arbitration configuration.

6. A system according to claim 2 wherein said means for selecting said configuration type further comprises:

means for defining a configuration field in a register of said I/O controller;

means for programming said configuration field with a selected one of said configuration type; and means for testing said configuration field at arbitration device initialization time to identify said configuration type.

7. A system according to claim 6 wherein said configuration type of said unknown device configuration includes:

means for preventing access to said local cache memory for any internal client and any external client to said I/O controller device.

8. A system according to claim 6 wherein said configuration type of said single device configuration includes:

means for limiting access to said local cache memory to only said plurality of internal clients of said I/O controller device.

9. A system according to claim 6 wherein said configuration type of said multiple device master configuration includes:

means for arbitrating access to said local cache memory among said plurality of internal clients of said I/O controller device and said at least one external client that is operationally independent of said I/O controller device.

10. A system according to claim 6 wherein said configuration type of said multiple device slave configuration includes:

an external master that controls access to said local cache memory;

means for arbitrating requests for access to said local cache memory from among said plurality of internal clients of said I/O controller device having said multiple device slave configuration; and means for requesting said external master for access to said local cache memory on behalf of one of said plurality of internal clients of said I/O controller device.

11. A method of operating a multiple client memory arbitration system for a first cache memory controlled by a first arbitration device and a second cache memory controlled by a second arbitration device, said method comprising:

arbitrating simultaneous access to said first cache memory and said second cache memory by only one of said first arbitration device and said second arbitration device at a time;

forwarding a first request for access to said first cache memory concurrently with a second request for access to said second cache memory; and returning a grant of access to said first cache memory and said second cache memory in response to said forwarding step.

12. A method according to claim 11 wherein said arbitrating step includes:

distinguishing a request for a mirrored write operation from among a plurality of requests for a local cache memory only; and preventing intervening requests for access to said first cache memory and said second cache memory between said forwarding step and said returning step.

13. A method according to claim 11 including:

executing active/active failover control of operational tasks between said first arbitration device and said second arbitration device that have executed mirrored write operations between respective ones of said first cache memory and said second cache memory.

14. A method according to claim 13 wherein said step of executing includes:

executing write back caching with said mirrored write to said local cache memory and said remote cache memory substantially concurrently by direction of said first arbitrator.

15. A method according to claim 11 including:

identifying a failed arbitrator between said first arbitration device and said second arbitration device; and continuing uninterrupted execution of operational tasks by a surviving one of said first arbitration device and said second arbitration device as an independent arbitration device of a single cache memory.

* * * * *